United States Patent
Zhang et al.

(10) Patent No.: US 8,565,819 B2
(45) Date of Patent: Oct. 22, 2013

(54) MOBILE TERMINAL, DISPLAY DEVICE AND CONTROLLING METHOD THEREOF

(75) Inventors: Kangwon Zhang, Seoul (KR); Woongchang Kim, Seoul (KR); Byoungwook Lee, Seoul (KR); Jeongseop Hwang, Seoul (KR); Jongsung Lee, Seoul (KR); Sunryang Kim, Seoul (KR); Eungkyu Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/150,953

(22) Filed: Jun. 1, 2011

(65) Prior Publication Data

US 2012/0040720 A1  Feb. 16, 2012

(30) Foreign Application Priority Data

Aug. 13, 2010  (WO) ................ PCT/KR2010/005349

(51) Int. Cl.
 *H04M 1/00* (2006.01)
 *H04B 1/38* (2006.01)
(52) U.S. Cl.
 USPC .......... 455/557; 455/556.1; 455/566
(58) Field of Classification Search
 USPC ...................... 455/557, 556.1, 566
 See application file for complete search history.

(56) References Cited

U.S. PATENT DOCUMENTS

| | | | |
|---|---|---|---|
| 2005/0186988 A1* | 8/2005 | Lim et al. ...................... | 455/557 |
| 2006/0203758 A1* | 9/2006 | Tee et al. ....................... | 370/315 |
| 2006/0259942 A1* | 11/2006 | Toyama et al. ............... | 725/133 |
| 2008/0049192 A1* | 2/2008 | Nozaki et al. .................. | 353/25 |
| 2008/0196072 A1* | 8/2008 | Chun .......................... | 725/105 |
| 2009/0061841 A1* | 3/2009 | Chaudhri et al. ............. | 455/420 |
| 2009/0221273 A1* | 9/2009 | de Leon et al. ............ | 455/414.1 |
| 2009/0262661 A1* | 10/2009 | Ueda et al. .................... | 370/254 |
| 2009/0318085 A1* | 12/2009 | Seshadri et al. ............. | 455/41.3 |
| 2010/0205628 A1* | 8/2010 | Davis et al. .................... | 725/25 |

FOREIGN PATENT DOCUMENTS

| | | |
|---|---|---|
| KR | 2002-0006106 A | 1/2002 |
| KR | 2003-0011146 A | 2/2003 |
| KR | 10-2006-0112893 A | 11/2006 |
| KR | 10-0744752 B1 | 8/2007 |

* cited by examiner

*Primary Examiner* — Kwasi Karikari
(74) *Attorney, Agent, or Firm* — Birch, Stewart, Kolasch & Birch, LLP

(57) ABSTRACT

A mobile terminal including a first display unit, an interface unit configured to be connected to an external display device having a second display unit, and a controller configured to receive a connection signal indicating a connection of the mobile terminal to the display device, to play a multimedia content on the first display unit, to provide video information of the multimedia content to the external display device, and to pause the playing of the multimedia content on the first display unit.

14 Claims, 23 Drawing Sheets

(6-1)

(6-2)

(6-3)

(7-1)

(7-2)

(7-3)

(10-1)

(10-2)

(10-3)

(12-1)

(12-2)

(12-3)

(14-1)

(14-2)

(14-3)

(16-1)

(16-2)

(21-1)

(21-2)

(23-1)

(23-2)

(23-3)

MOBILE TERMINAL, DISPLAY DEVICE AND CONTROLLING METHOD THEREOF

This application claims the benefit of the International Patent Application No. PCT/KR2010/005332 filed on Aug. 13, 2010, which is hereby incorporated by reference as if fully set forth herein.

BACKGROUND OF THE INVENTION

1. Field of the Invention

The present invention relates to a mobile terminal, and more particularly, to a mobile terminal, display device and controlling method thereof. Although the present invention is suitable for a wide scope of applications, it is particularly suitable for enabling data communications between a mobile terminal and a display device when the mobile terminal and the display device are connected together in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

The mobile terminal can be connected to such a display device as a notebook computer, a tablet computer, a personal computer, a television set and the like by wire or wireless and can perform data communications in-between. When the data communications are performed between the mobile terminal and the display device, the demand for a method of displaying information on the data communications in-between on the mobile terminal and the display device is ongoing to rise in further consideration of terminal user's convenience.

SUMMARY OF THE INVENTION

Accordingly, the present invention is directed to a mobile terminal, display device and controlling method thereof that substantially obviate one or more problems due to limitations and disadvantages of the related art.

An object of the present invention is to provide a mobile terminal, display device and controlling method thereof, by which when the data communications are performed between the mobile terminal and the display device, information on the data communications in-between can be displayed on the mobile terminal and the display device in further consideration of terminal user's convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a first display unit, an interface unit configured to be connected to an external display device having a second display unit, and a controller configured to: display a multimedia content image on the first display unit while playing a multimedia content, and upon establishing connection with the external display, decide whether to provide a video information of the multimedia content to the external display device depending on whether the mobile terminal retains a forwarding authority of the multimedia content.

In another aspect of the present invention, a display device includes an interface unit configured to connect an external mobile terminal having a first display unit, a second display unit: and a controller configured to: upon establishing connection with the external mobile terminal which plays a multimedia content to display a multimedia content image on the first display unit, receive a video information of the multimedia content from the external mobile terminal, receive a video information of the multimedia content from the external mobile terminal, and decide whether to display the multimedia content image on the second display unit depending on whether the display device retains a play authority of the multimedia content.

In another aspect of the present invention, a method of controlling a mobile terminal includes displaying a multimedia content image on a first display unit while playing a multimedia content, connecting the mobile terminal to an external display device having a second display unit, and providing a video information of the multimedia content to the external display device depending on whether the mobile terminal retains a forwarding authority of the multimedia content.

In another aspect of the present invention, a method of controlling a display device includes connecting an external mobile terminal having a first display unit, the external mobile terminal playing a multimedia content to display a multimedia content image on the first display unit, to the display device having a second display unit, and receiving a video information of the multimedia content from the external mobile terminal to display the multimedia content image on the second display unit depending on whether the display device retains a play authority of the multimedia content.

In another aspect of the present invention, a mobile terminal includes a first display unit, an interface unit configured to be connected to an external display device having a second display unit, and a controller configured to: display a multimedia content image on the first display unit while playing a multimedia content, upon establishing connection with the external display device, provide video information of the multimedia content to the external display device and pause the play of the multimedia content.

In another aspect of the present invention, a display device includes an interface unit configured to connect an external mobile terminal having a first display unit, a second display unit, and a controller configured to: upon establishing connection with the external mobile terminal which plays a multimedia content to display a multimedia content image on the first display unit, receive a video information of the multimedia content from the external mobile terminal, and control the external mobile terminal to pause a play of the multimedia content.

In another aspect of the present invention, a method of controlling a mobile terminal includes displaying a multimedia content image on a first display unit while playing a multimedia content, connecting the mobile terminal to an external display device having a second display unit, and upon establishing connection with the external display device, providing video information of the multimedia content to the external display device and pausing the play of the multimedia content.

In a further aspect of the present invention, a method of controlling a display device includes connecting an external mobile terminal having a first display unit, the external mobile terminal playing a multimedia content to display a multimedia content image on the first display unit, to the display device having a second display unit, upon establishing connection with the external mobile terminal, receiving a video information of the multimedia content from the external mobile terminal, and controlling the external mobile terminal to pause a play of the multimedia content.

Accordingly, the present invention provides the following effects and/or advantages.

First of all, as the mobile terminal and the display device are connected to each other, when a multimedia content is played in the mobile terminal, an image of the multimedia content is played in the display device in consideration of whether the mobile terminal or the display device has a use authority of the multimedia content. Therefore, it is able to prevent a violation of the use authority precausionally.

Secondly, when the mobile terminal and the display device are connected/disconnected to/from each other, the multimedia content playback in the mobile terminal can be temporarily interrupted.

Thirdly, when the mobile terminal and the display device are connected/disconnected to/from each other, a terminal user's privacy can be protected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

First of all, a mobile terminal according to the present invention is described as follows.

The present invention can be applicable to a various types of terminals. Examples of such terminals include mobile terminals, such as mobile phones, smart phones, notebook computers (laptop computers), digital broadcast terminals, personal digital assistants, portable multimedia players (PMP) and navigators.

Figure 1:
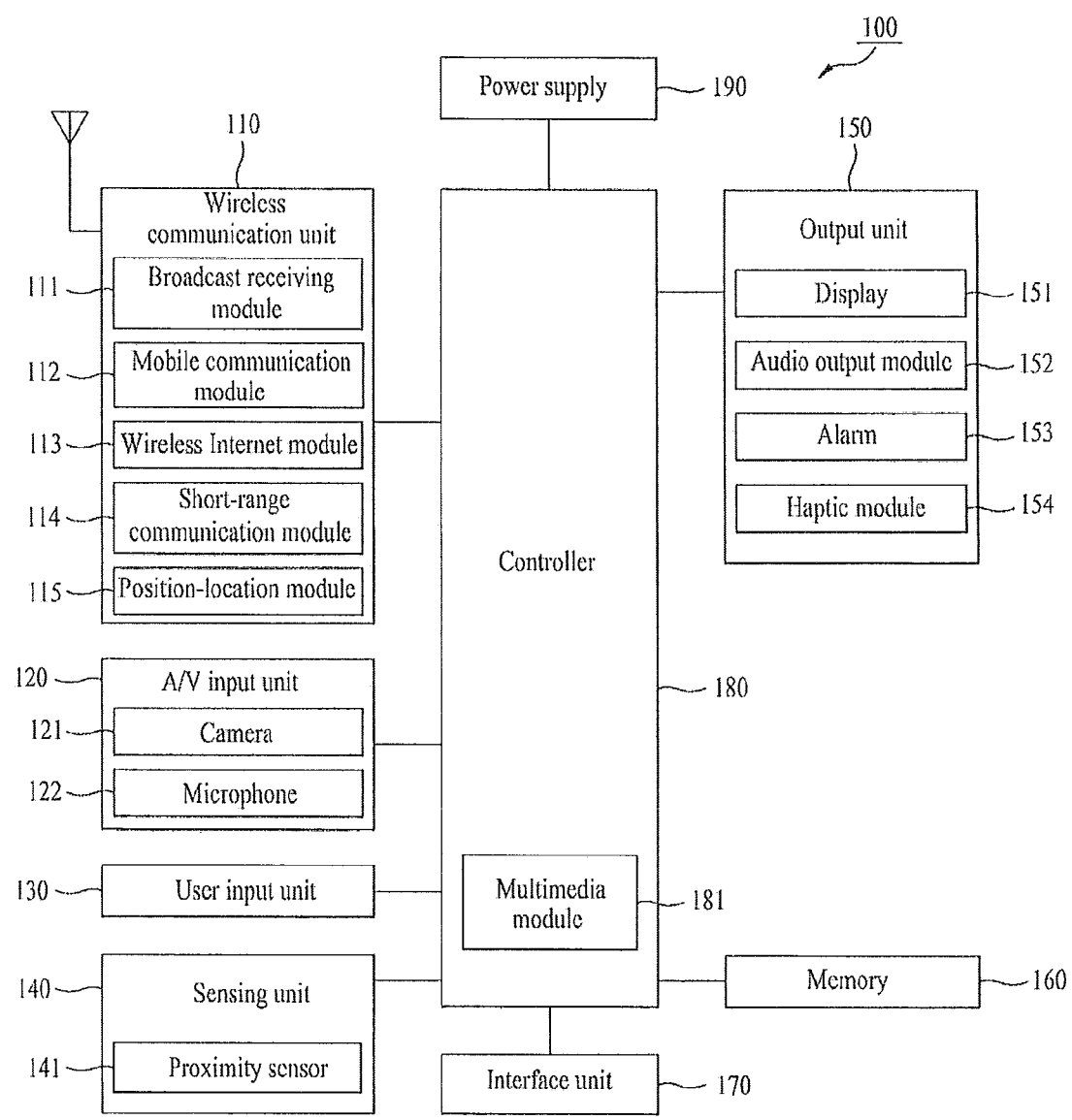
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this instance, the broadcast associated information can be received by the mobile communication module 112.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless Internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise determines the location of the mobile terminal 100. If desired, this module may be implemented with a global positioning system (GPS) module.

According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are determined by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. For example, the sensing unit includes one of a gyroscope sensor, acceleration sensor, a geomagnetic sensor and the like. As an example, consider the mobile terminal 100 being configured as a slidetype mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is generally implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

Considering that the wireless internet module 113 and the short-range communication module 114 are usable as the wireless data ports, each of the wireless internet module 113 and the short-range communication module 114 can be understood as a sort of the interface unit 170.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 generally controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input performed on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the above description, so far, the mobile terminal according to an embodiment of the present invention is described. In the following description, a display device according to an embodiment of the present invention is explained. First of all, no limitation is put on a display device described in this disclosure as long as the display device can receive and display information on a display of the mobile terminal by being connected to the mobile terminal for communications in-between. For example, the display device can include one of a notebook computer (laptop), a tablet computer, a desktop computer, a television set (e.g., a digital TV set, a smart TV set, etc.) and the like.

Figure 2:
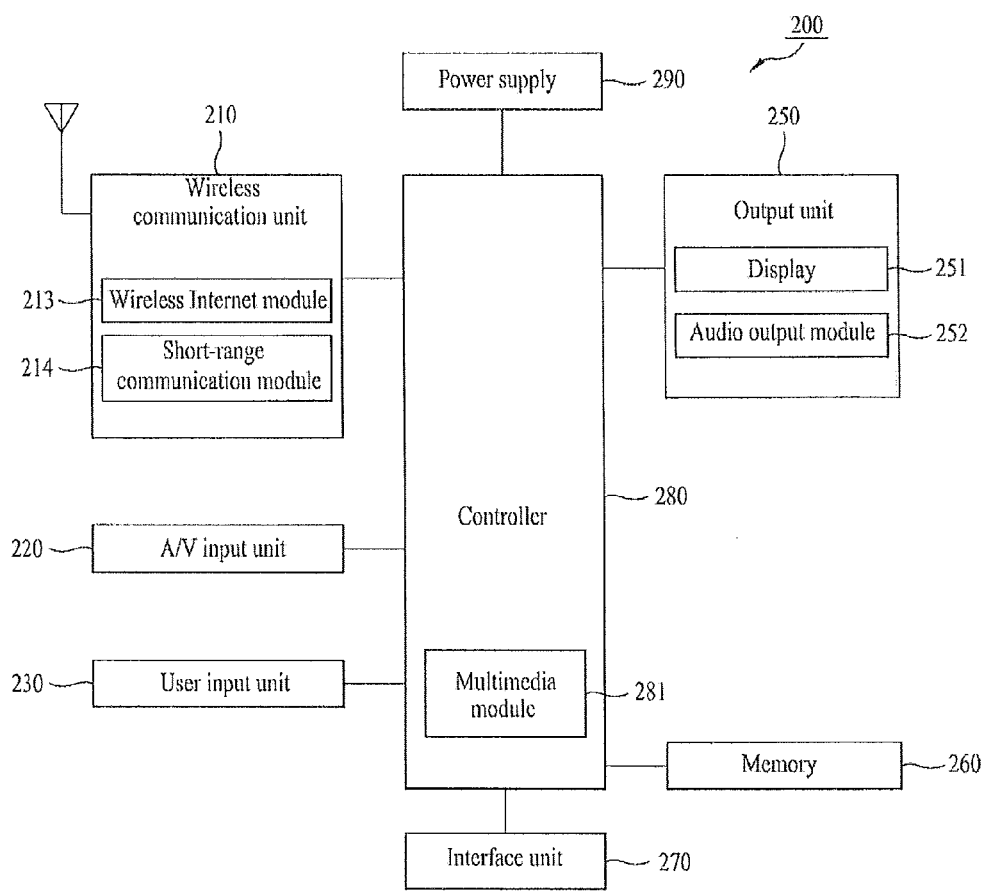
FIG. 2 is a block diagram of a display device according to one embodiment of the present invention.

FIG. 2 is a block diagram of a display device 200 according to one embodiment of the present invention.

Referring to FIG. 2, the display device 200 includes a wireless communication unit 210, an A/V (audio/video) input unit 220, a user input unit 230, an output unit 250, a memory 260, an interface unit 270, a controller 280, a power supply unit 290 and the like.

The wireless communication unit 210 can include a wireless internet module 213 and a short-range communication module 214. The output unit 250 can include a display unit 251 and an audio output module 253.

Because the components of the display device 200 are identical or mostly similar to the corresponding components of the above-described mobile terminal, their details are omitted from the following description for clarity of this disclosure.

Because the components shown in FIG. 2 are not entirely mandatory, more or less components can be implemented for the display device. For instance, when the display device 200 is a television, the device can further include a broadcast receiving module. Moreover, when the display device 200 is the television, the device may not be provided with the wireless Internet module. Of course, the display device 200 can include the wireless internet module. Because the broadcast receiving module is identical or mostly similar to the former broadcast receiving module 111 of the mobile terminal 100 described with reference to FIG. 1, its detail are omitted from the following description for clarity of this disclosure.

How to connect the mobile terminal 100 and the display device 200 together will now be explained with reference to FIG. 3 and FIG. 4. In particular, FIG. 3 is a flowchart according to an embodiment of the present invention, and FIG. 4 is a diagram of a mobile terminal and a display device connected to each other to implement an embodiment of the present invention.

Figure 3:
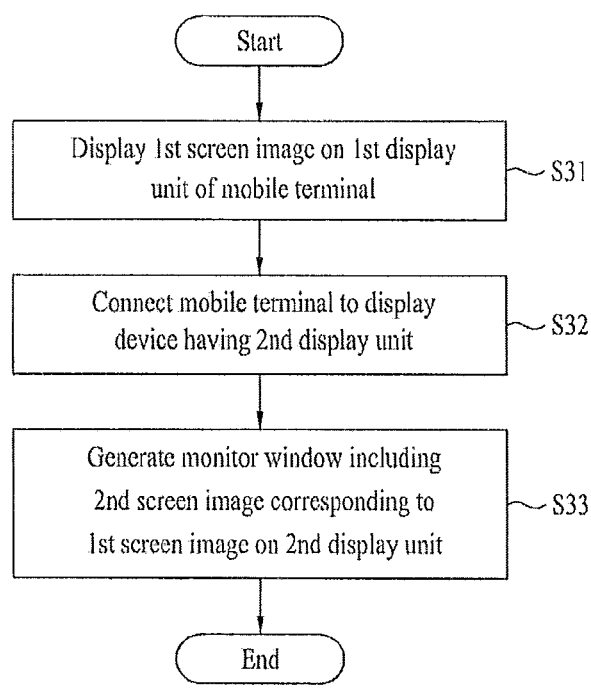
FIG. 3 is a flowchart according to an embodiment of the present invention.
Figure 4:
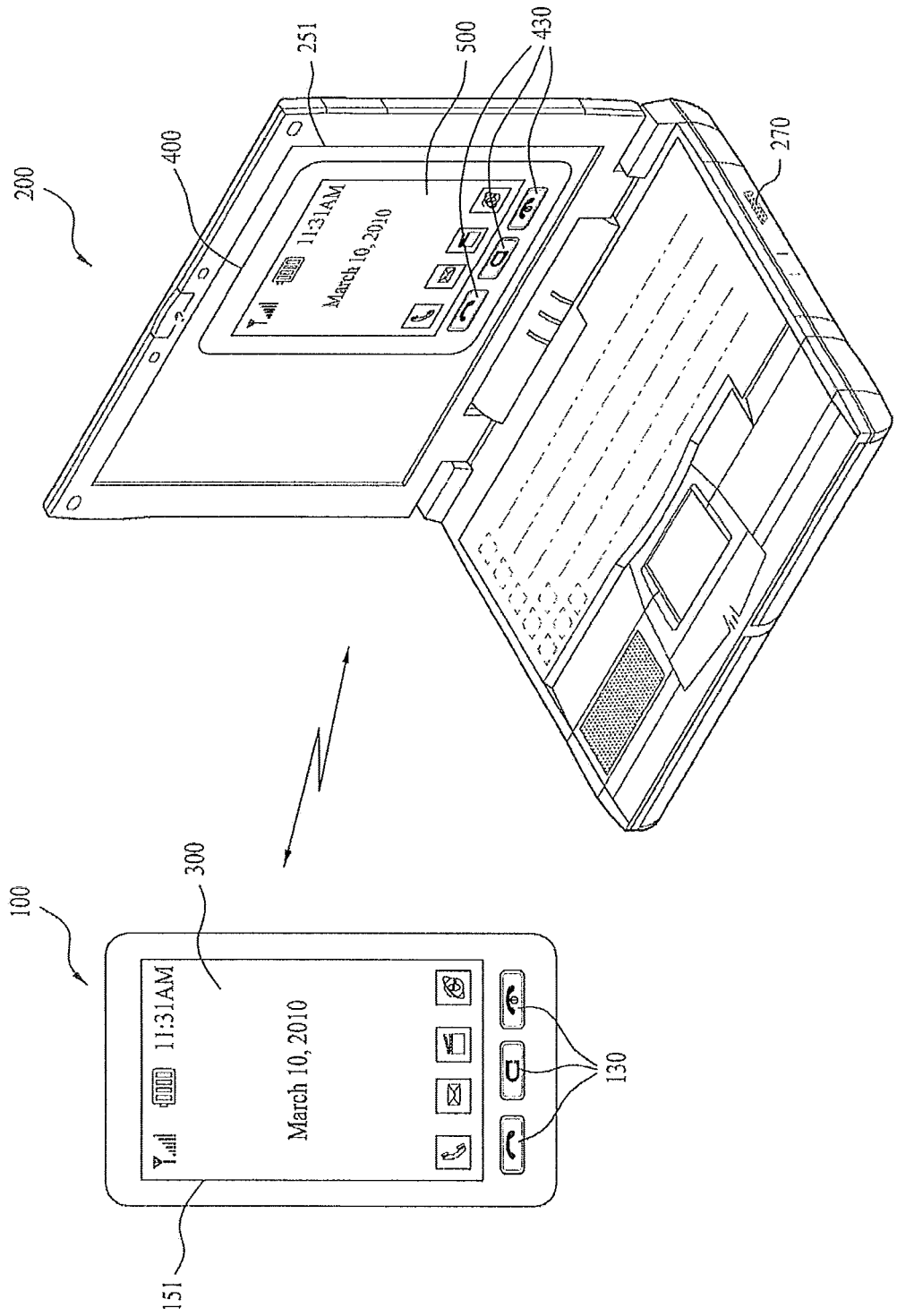
FIG. 4 is a diagram of a mobile terminal and a display device connected to each other according to an embodiment of the present invention.

Referring to FIG. 3 and FIG. 4, the mobile terminal 100 and the display device 200 can be connected to each other via the interface unit 170 of the mobile terminal 100 and the interface unit 270 of the display device 200. The connection between the mobile terminal 100 and the display device 200 can be established by wire communication or wireless communication (e.g., short-range communication, wireless internet communication, etc.).

FIG. 4 illustrates a state that the mobile terminal 100 and the display device 200 are connected to each other.

For clarity and convenience of the following description, in order to respectively identify the components of the mobile terminal 100 and the display device 200, 'first' will be prefixed to a corresponding one of the components of the mobile terminal 100, while 'second' will be prefixed to a corresponding one of the components of the display device 200.

For instance, the display unit 151 of the mobile terminal 100 is named a first display unit 151, the controller 180 of the mobile terminal 100 is named a first controller 180, the display unit 251 of the display device 200 is named a second display unit 251, and the controller 280 of the display device 200 is named a second controller 280. In addition, an image displayed on the first display unit 151 is named a first screen image 300.

A first screen image 300 can be displayed on the first display unit 151 of the mobile terminal 100 (S31). Once the connection between the mobile terminal 100 and the display device 200 is established, the mobile terminal 100 provides information on a first screen image displayed on the first display unit 151 to the display device 200 (S32).

In this instance, an application (e.g., a plug-in software, etc.) for processing the information on the first screen image received from the mobile terminal 100 can be installed at the display device 200 in advance.

Hence, when the mobile terminal 100 and the display device 200 are connected to each other, the second controller 280 of the display device 200 can control a monitor window 400 for the first screen image to be displayed on the second display unit 251. The second controller 280 of the display device 200 then controls an image corresponding to the first screen image to be displayed on the monitor window 400 (S33). For clarity of the following description, in order to be discriminated from the first screen image 300 displayed in the mobile terminal 100, the image displayed on the monitor window 400 is named a second screen image 500.

In particular, the monitor window 400 can have a shape identical or similar to one face of a housing to which the first display unit 151 of the mobile terminal 100 is attached. Therefore, when prescribed key buttons 130 are provided to the face of the housing, soft key buttons 430 having the same shapes of the prescribed key buttons can be formed at the corresponding locations, respectively.

If the soft key button 430 is clicked by a mouse in the display device 200 (or the soft key button 430 is touched when the second display unit 251 includes a touchscreen), the second controller 280 of the display device 200 can send a control signal, which indicates that the soft key button 430 as been manipulated in the display device 200, to the mobile terminal 100.

If so, the first controller 180 of the mobile terminal 100 receives the control signal and can then control a specific function corresponding to the manipulation of the prescribed key button 130 matching the manipulated soft key button 430 to be executed in the mobile terminal 100.

Further, the first controller 180 of the mobile terminal 100 can control an image according to the executed specific function to be displayed as the first screen image 300 on the first display unit 151. Subsequently, the first controller 180 of the mobile terminal 100 can send information on the first screen image 300, which includes the image according to the executed specific function, to the display device 200.

If so, the second controller 280 of the display device 200 controls the second screen image 500 corresponding to the received first screen image 300 to be displayed on the monitor window 400.

Therefore, a user can indirectly manipulate the mobile terminal 100 by manipulating the monitor window 400 of the display device 200 instead of directly manipulating the mobile terminal 100. Also, the user can view the first screen image 30 of the mobile terminal 100 by viewing the second screen image 500 of the display device 200.

It is not mandatory for the monitor window 400 to have a shape identical or similar to one face of the housing having the first display unit 151 of the mobile terminal 100 loaded thereon. For instance, other icons (e.g., a window close icon, a window minimize icon, a window maximize icon, etc.) can be further shown in the monitor window 400 in addition to one face of the housing. Alternatively, the second screen image 500 can be displayed on the monitor window 400 without the shape of the housing face.

In addition, the display device 200 receives information on the first screen image 300 from the mobile terminal 100 and then displays the received information as the second screen image 500 on the monitor window 400. Therefore, the first screen image 300 and the second screen image 500 can share a content image generated from the mobile terminal 100 with each other.

Next, FIG. 4 shows that the content image generated from the mobile terminal 100 is a standby image, by which the present embodiment is non-limited. The content image generated from the mobile terminal 100 includes an image related to every function, Menu or application executed in the mobile terminal 100.

How the mobile terminal 100 provides the information on the first screen image to the display device 200 will now be explained. First, the first controller 180 of the mobile terminal 100 captures the first screen image 300 displayed on the first display unit 151 and then transmits the captured first screen image as the aforesaid information on the first screen 300 to the display device 200. Afterwards, the second controller 280 of the display device 200 receives the captured first screen image 300 and then controls the received first screen image to be displayed as the second screen image 500 on the monitor window 400.

In doing so, the first screen image 300 and the second screen image 500 can depend on each other for zoom-in or zoom-out for example features, for example. In particular, if the first screen image 300 zooms in or out, the second screen image 500 can zoom in or out correspondingly. Moreover, contents of the first and second screen images 300 and 500 can become dependent on each other.

Otherwise, the first controller 180 of the mobile terminal 100 can transmit a video signal input to the first display unit 151 to the display device 200 as the information on the first screen image 300. The first display unit 151 of the mobile terminal 100 can then output the video signal as the first screen image 300. Meanwhile, the second controller 280 of the display unit 200 receives the transmitted video signal and can then output the received video signal as the second screen image 500 to the monitor window 400 of the second display unit 251. In particular, the first display unit 151 and the second display unit 251 can share the video signal output from the first controller 180 with each other. In the following description, the video signal is named a shared video signal.

In this instance, the first screen image 300 and the second screen image 500 can depend on each other for zoom-in or zoom-out features, for example. In particular, if the first screen image 300 zooms in or out, the second screen image 500 can zoom in or out correspondingly. Moreover, contents of the first and second screen images 300 and 500 can become dependent on each other.

Further, the first controller 180 of the mobile terminal 100 generates a first video signal and a second video signal independent from the first video signal in which both the first and second video signals relate to a specific content image generated from the mobile terminal 100. The first controller 180 can input the first video signal to the first display unit 151 and transmit the second video signal as the information on the first screen image to the display device 200. The first display unit 151 of the mobile terminal 100 can then output the first video signal as the first screen image 300.

Meanwhile, the second controller 280 of the display device 200 receives the transmitted second video signal and can output the received second video signal as the second screen image 500 on the monitor window 400 of the second display unit 251. It should be noted that each of the first and second video signals are discriminated from the shared video signal in that the first video signal and the second video signal are independently provided to the first display unit 151 and the second display unit 251, respectively.

In this instance, the first screen image 300 and the second screen image 500 can become independent from each other in enlargement and reduction features, for example. In particular, the second screen image 500 can zoom in or out irrespective of the zoom adjustment of the first screen image 300. Moreover, the first screen image 300 and the second screen image 500 can become independent from each other in their contents.

In the above description, as the mobile terminal 100 and the display device 200 are connected to each other, the first screen image 300 displayed on the first display unit 151 and the monitor window 400 and the second screen image 500 displayed on the second display unit 251 are schematically explained.

Figure 5:
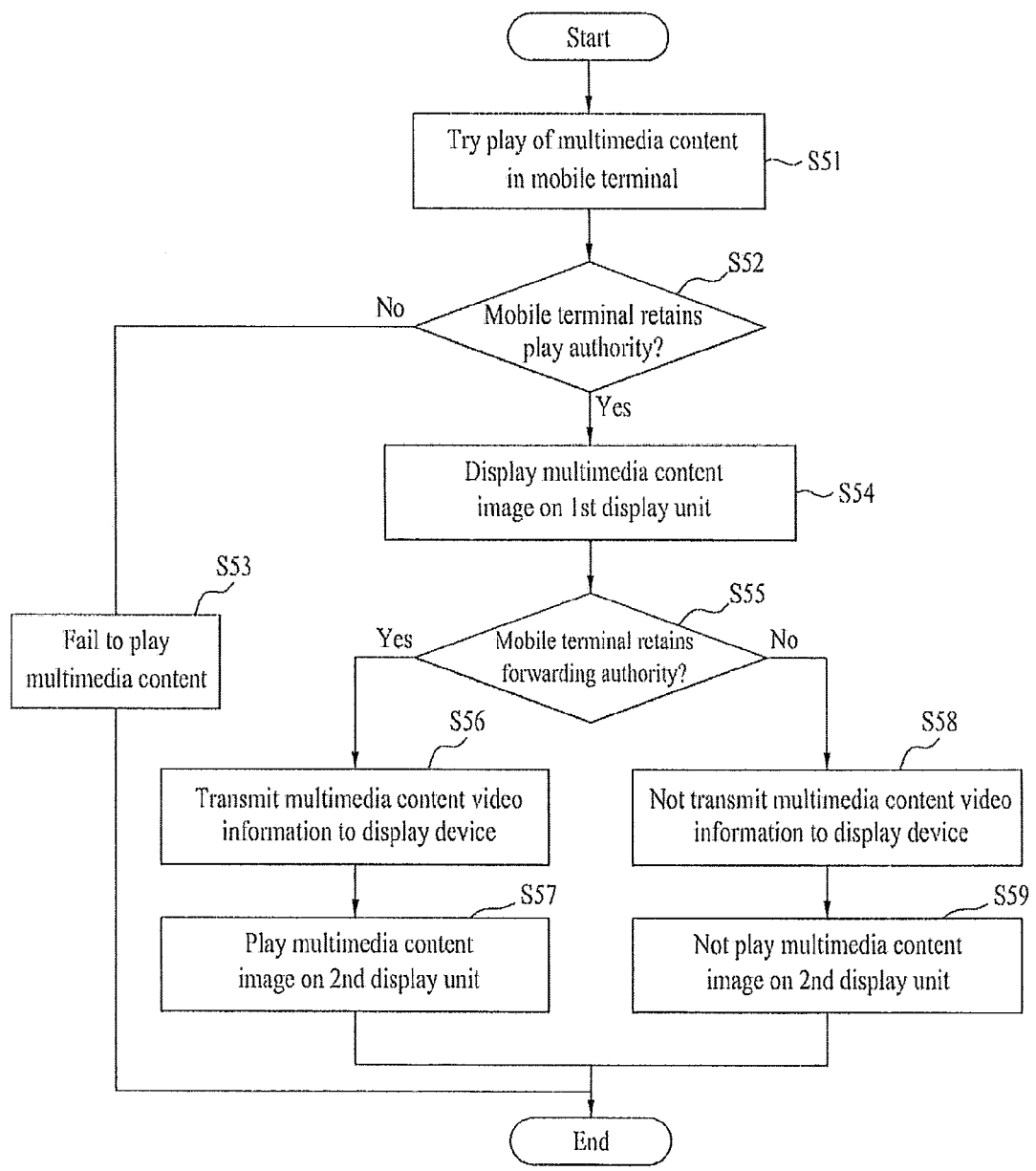
FIG. 5 is a flowchart according to an embodiment of the present invention.
Figure 6:
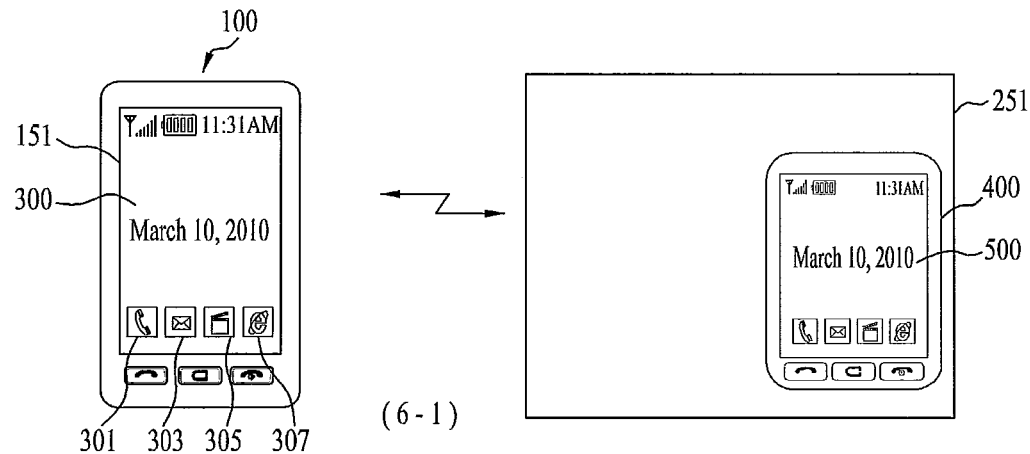
FIG. 6 and FIG. 7 are diagrams of a front side of a mobile terminal and a screen of a display unit of a display device according to an embodiment of the present invention.
Figure 6:
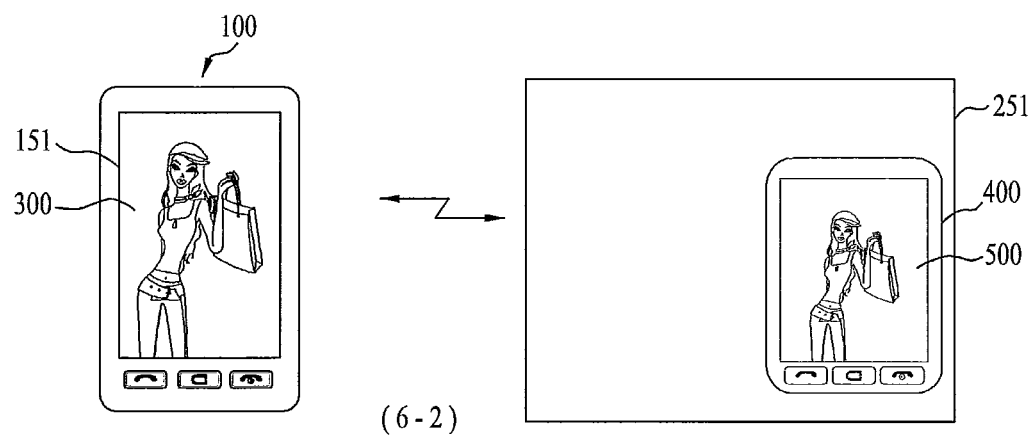
Figure 6:
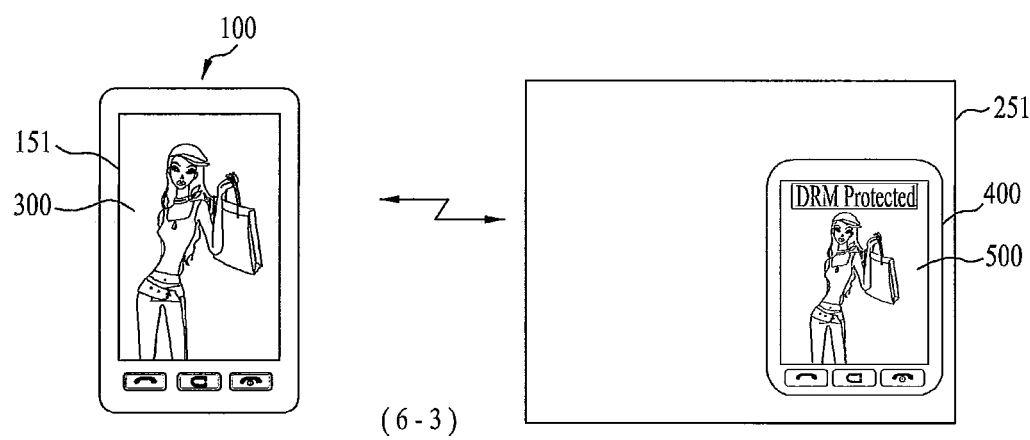
Figure 7:
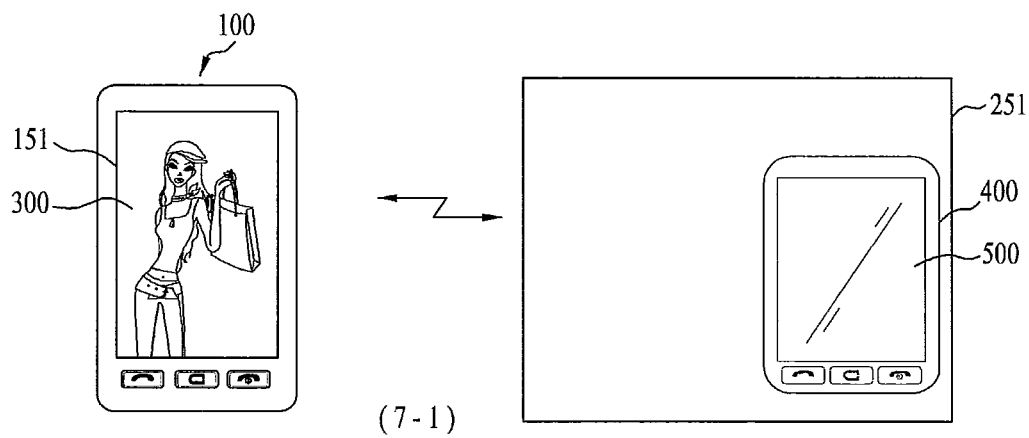
Figure 7:
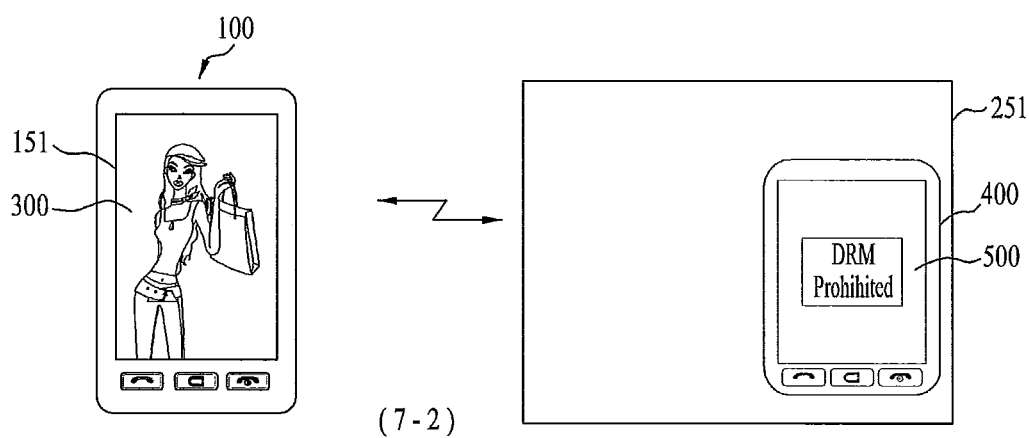
Figure 7:
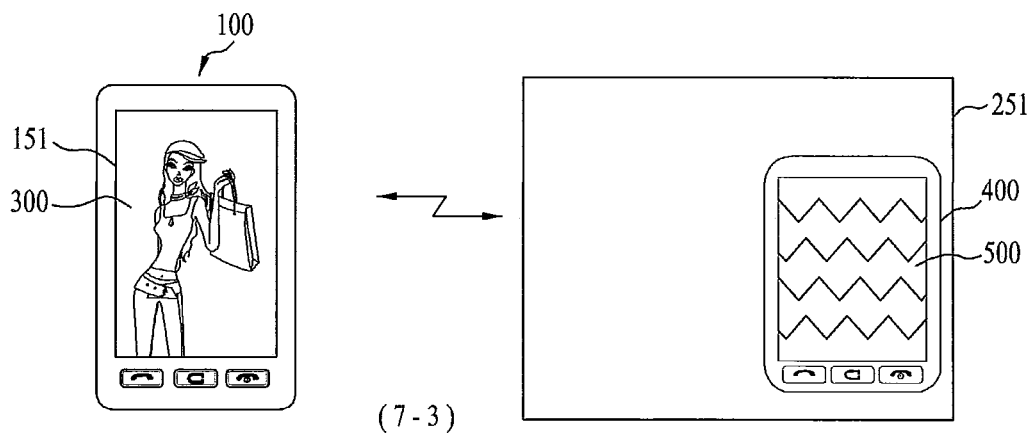

The following description describes the first screen image 300 and the second screen image 500 displayed when a multimedia content is played back in the mobile terminal 100 with reference to FIGS. 5 to 7. Further, in the following description, both of the first display unit 151 of the mobile terminal 100 and the second display unit 251 of the display device 200 can include touchscreens, respectively. However, the embodiment of the present invention is applied not only to the first and second display units 151 and 251 including the touchscreens but also to the first and second display units 151 and 251 including normal displays.

Next, FIG. 5 is a flowchart according to an embodiment of the present invention, and FIGS. 6 and 7 are diagrams of a front side of the mobile terminal 100 and a screen of a display unit of the display device 200 according to an embodiment of the present invention.

Referring to FIG. 6 (6-1), the mobile terminal 100 and the display device 200 can be connected to each other. As shown, the first screen image 300 is displayed on the first display unit 151 of the mobile terminal 100, the monitor window 400 is displayed on the second display unit 251 of the display device 200, and the second screen image 500 is displayed on the monitor window 400.

If a multimedia play menu icon 305 is selected from a plurality of menu icons 301, 303, 305 and 307 displayed in the first screen image 300 of the first display unit 151, a playback of a multimedia content can be attempted in the mobile terminal 100 (S51). In this instance, the multimedia content includes a content to which DRM (digital rights management) is applied.

If so, the first controller 180 of the mobile terminal 100 can determine whether the mobile terminal 100 has a use authority (particularly, a play authority) for a playback of the multimedia content (S52). In more detail, the use authority can be mainly classified into 'play authority' and 'transmission authority'. The play authority means the authority for playing back a corresponding multimedia content in a corresponding terminal, and the transmission authority means the authority for providing a corresponding multimedia content from a corresponding terminal to another terminal.

Subsequently, if the first controller 180 of the mobile terminal 100 determines that the mobile terminal does not retain the play authority for the play back of the multimedia content (No in S52), the first controller 180 can control the multimedia content not to be played back (S53). On the contrary, if the first controller 180 of the mobile terminal 100 determines that the mobile terminal retains the play authority for the play back of the multimedia content (Yes in S52), the first controller 180 plays back the multimedia content and can control a corresponding multimedia content image to be displayed as the first screen image 300 on the first display unit 151 of the mobile terminal 100 (FIG. 6 (6-2)) (S54).

The following description assumes that the mobile terminal 100 retains the play authority of the multimedia content. Subsequently, the first controller 180 of the mobile terminal 100 determines whether the mobile terminal 100 retains a transmission authority of the multimedia content (S55).

If the first controller 180 of the mobile terminal 100 determines that the mobile terminal 100 retains the transmission authority of the multimedia content (Yes in S55), the first controller 180 provides the display device 200 with video information of the multimedia content as information on the first screen image 300 (S56).

The second controller 280 of the display device 200 then receives the video information of the multimedia content and controls the multimedia content image to be displayed as the second screen image 500 on the monitor window 400 of the second display unit 251 (FIG. 6 (6-2)) (S57).

When the first controller 180 of the mobile terminal 100 provides the video information of the multimedia content to the display device 200, the first controller 180 can also control audio information of the multimedia content to be provided together.

Therefore, when the multimedia content image is played backed on the second display unit 251, the second controller 280 of the display device 200 can control an audio of the multimedia content to be output from the display device 200.

Meanwhile, when the first controller 180 of the mobile terminal 100 transmits the video information of the multimedia content to the display device 200, the first controller 180 can guide information indicating that the multimedia content is protected by DRM together with the video information.

Therefore, when the second controller 280 of the display device 200 displays the multimedia content image as the second screen image 500 on the monitor window 400, the second controller 280 can display the first guide information 520, which indicates that the multimedia content is the content protected by DRM, together (FIG. 6 (6-3)). In this instance, the first guide information 520 can also indicate that the mobile terminal 100 retains a forwarding authority of the multimedia content in a user's aspect.

If the first controller 180 of the mobile terminal 100 determines that the transmission authority is not retained (No in S55), the first controller 180 of the mobile terminal 100 does not provide the video information of the multimedia content to the display device 200 (S58).

If so, referring to FIG. 7 (7-1), the second controller 280 of the display device 200 is unable to display the multimedia content image on the monitor window 400 of the second display unit 251 (S59). Optionally, if the mobile terminal 100 does not retain the transmission authority for the multimedia content, the monitor window 400 may not be displayed on the second display unit 251.

When the video information of the multimedia content is not provided, the first controller 180 of the mobile terminal 100 can transmit second guide information, which indicates that the use of the multimedia content is restricted by DRM, to the display device 200.

If so, referring to FIG. 7 (7-2), the second controller 280 of the display device 200 can display the second guide information 525, which indicates that the use of the multimedia content is restricted by DRM, on the monitor window 400 of the second display unit 251.

In this instance, the second guide information 525 can indicate that the mobile terminal 100 does not retain a forwarding authority of the multimedia content in a user's aspect.

Meanwhile, the first controller 180 of the mobile terminal 100 transmits a video information of an alternative image to the display device 200 instead of transmitting the video information of the multimedia content. If so, referring to FIG. 7 (7-3), the second controller 280 of the display device 200 can control the alternative image to be displayed as the second screen image 500 on the monitor window 400 of the second display unit 251. Optionally, the alternative image can be displayed on the second display unit 251 together with the second guide information.

If the first controller 180 of the mobile terminal 100 is unable to provide the video information of the multimedia content to the display device 200, the first controller 180 may be unable to provide the audio information of the multimedia content as well. Therefore, if the multimedia content image is not playable in the second display unit 251 of the display device 200, the second controller 280 of the display device 200 may not be able to control the audio of the multimedia content to be output from the display device 200.

Optionally, when the multimedia content is played in the mobile terminal 100, and the mobile terminal 100 is connected to the display device 200, if the mobile terminal 100 does not retain the forwarding authority of the multimedia content, the second controller 280 of the display device 200 can control the monitor window not to be generated from the second display unit 251.

According to the above description, after the mobile terminal 100 and the display device 200 have been connected together, the multimedia content is played back in the mobile terminal 100. Even if the mobile terminal 100 and the display device 200 are connected after the playback of the multimedia content in the mobile terminal 100, it is apparent to those skilled in the art that the above description is applicable to this case.

According to the above description, the multimedia content image can be optionally played in the display device 200 depending on whether the mobile terminal 100 retains the transmission authority of the multimedia content.

In the following description, the multimedia content image can be optionally played in the display device 200 depending on whether the display device 200 retains the play authority of the multimedia content. This will be described with reference to FIG. 8 as follows.

Figure 8:
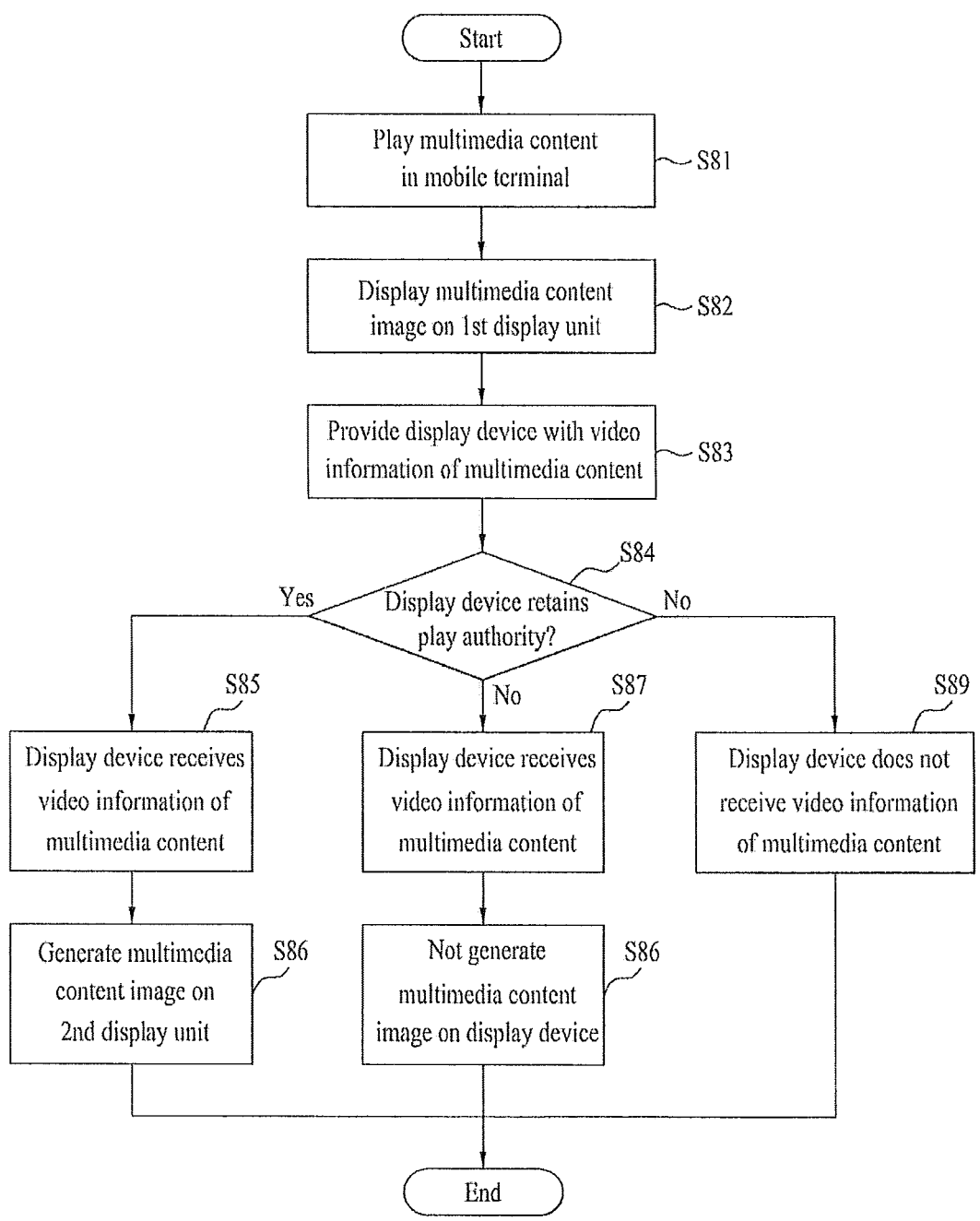
FIG. 8 is a flowchart according to an embodiment of the present invention.

In particular, FIG. 8 is a flowchart according to an embodiment of the present invention. In the following description with reference to FIG. 8, the mobile terminal 100 provides the video information of the multimedia content to the display device 200 irrespective of whether to retain the transmission authority of the multimedia content.

Referring to FIG. 8, as mentioned in the foregoing description, the multimedia content can be played in the mobile terminal 100 (S81). Therefore, the multimedia content image can be displayed as the first screen image 300 on the first display unit 151 of the mobile terminal 100.

And, the first controller 180 of the mobile terminal 100 can control the video information of the multimedia content to be provided as information on the first screen image to the display device 200 (S83). As mentioned in the foregoing description, when the first controller 180 of the mobile terminal 100 provides the video information of the multimedia content to the display device 200, the first controller 180 of the mobile terminal 100 can provide the audio information of the multimedia content together with the video information.

If so, the second controller 280 of the display device 200 can determine whether the display device 200 retains the play authority of the multimedia content (S84). As a result of the determination, if the second controller 280 of the display device 200 determines that the display device 200 retains the play authority of the multimedia content (Yes in S84), the second controller 280 of the display device 200 can control the video information of the multimedia content to be received from the mobile terminal (S85).

Subsequently, the second controller 280 of the display device 200 controls the multimedia content image to be displayed on the monitor window 400 of the second display unit 251 using the received video information of the multimedia content.

In addition, the second controller 280 of the display device 200 can receive the audio information of the multimedia content when receiving the video information of the multimedia content. Moreover, when the multimedia content image is played on the second display unit 251, the second controller 280 of the display device 200 can control the multimedia content audio to be output together using the received audio information of the multimedia content.

When the multimedia content image is played on the second display unit 251, the second controller 280 of the display device 200 can display a first guide information, which indicates the that multimedia content is the content protected by DRM, together with the multimedia content image. In this instance, the first guide information is received by the display device 200 from the mobile terminal 100 or can be self-generated by the display device 200.

Alternatively, as a result of the determination, if the second controller 280 of the display device 200 determines that the display device 200 fails to retain the play authority of the multimedia content (No in S84), the second controller 280 of the display device 200 may receive the video information of the multimedia content from the mobile terminal 100 (S87). However, the second controller 280 of the display device 200 controls the multimedia content image not to be displayed on the monitor window 400 of the second display unit 251 using the received video information of the multimedia content (S88).

Further, the second controller 280 of the display device 200 can control a second guide information, which indicates that the use of the multimedia content is restricted by DRM, to be displayed on the monitor window 400 of the second display unit 251. Moreover, the second controller 280 of the display device 200 can control an alternative image of the multimedia content image to be displayed on the monitor window 400 of the second display unit 251.

In this instance, the second guide information and the alternative image are received by the display device 200 from the mobile terminal 100 or can be self-generated by the display device 200.

If it is determined that the display device 200 fails to retain the play authority of the multimedia content, the second controller 280 can control the multimedia content audio not to be output from the display device 200 despite receiving the audio information of the multimedia content from the mobile terminal 100.

On the contrary, as a result of the determination, if it is determined that the display device 200 fails to retain the play authority of the multimedia content (No in S84), the second controller 280 of the display device 200 can control the video information of the multimedia content not to be received from the mobile terminal 100 at all (S89). In this instance, the second controller 280 of the display device 200 is unable to play back the multimedia content image on the second display unit 251. Besides, as mentioned in the foregoing description, the second controller 280 of the display device 200 can display at least one of the alternative image and the second guide information instead of displaying the multimedia content image.

If it is determined that the display device 200 fails to retain the play authority of the multimedia content, the second controller 280 can control the audio information of the multimedia content not to be received from the mobile terminal 100 at all. In this instance, the second controller 280 of the display device 200 is unable to output the multimedia content audio.

In the description with reference to FIG. 8, irrespective of whether the mobile terminal 100 retains the transmission authority of the multimedia content, the image of the multimedia content is displayed on the second display unit 251 by depending on whether the display device 200 retains the play authority of the multimedia content. That is, the transmission authority retained by the mobile terminal 100 for the multimedia content is regarded as being independent from the play authority retained by the display device 200.

Yet, according to this disclosure, the transmission authority retained by the mobile terminal 100 for the multimedia content and the play authority retained by the display device 200 can be dependent on each other. That is, if the mobile terminal 100 retains the transmission authority of the multimedia content, it can mean that the display device 200 also has the play authority of the multimedia content.

According to the above description, the multimedia content image is optionally played on the second display unit 251 by depending on whether the mobile terminal 100 retains the transmission authority of the multimedia content or whether the display device 200 has the play authority of the multimedia content. In the following description, when the mobile terminal 100 and the display device 200 are connected to each other, whether to keep playing the multimedia content in the first display unit 151 can be determined by depending on whether the mobile terminal 100 retains the transmission authority of the multimedia content. This is explained in detail with reference to FIGS. 9 and 10 as follows.

Figure 9:
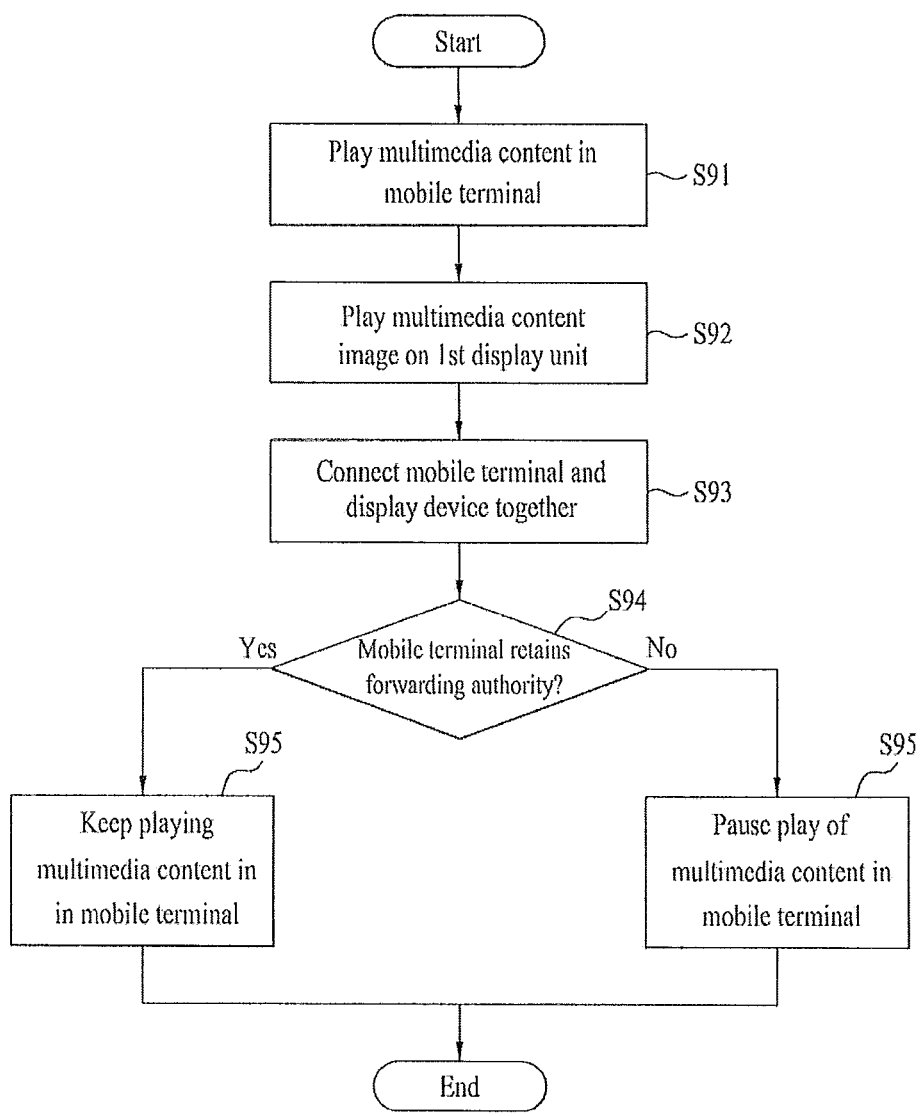
FIG. 9 is a flowchart according to an embodiment of the present invention.
Figure 10:
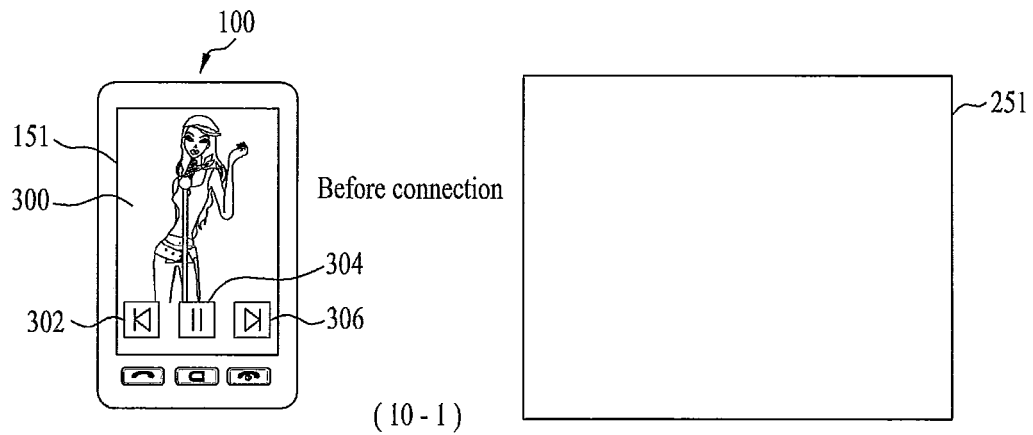
FIG. 10 is a diagram of a front side of a mobile terminal and a screen of a display unit of a display device according to an embodiment of the present invention.
Figure 10:
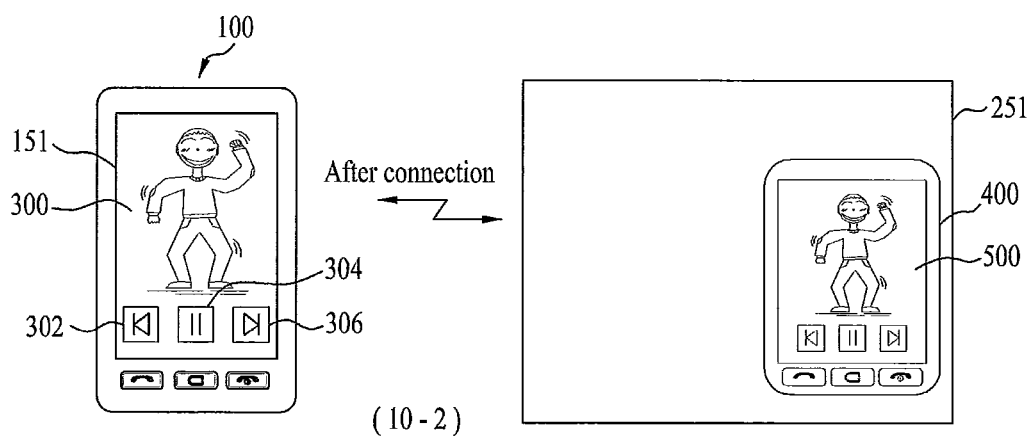
Figure 10:
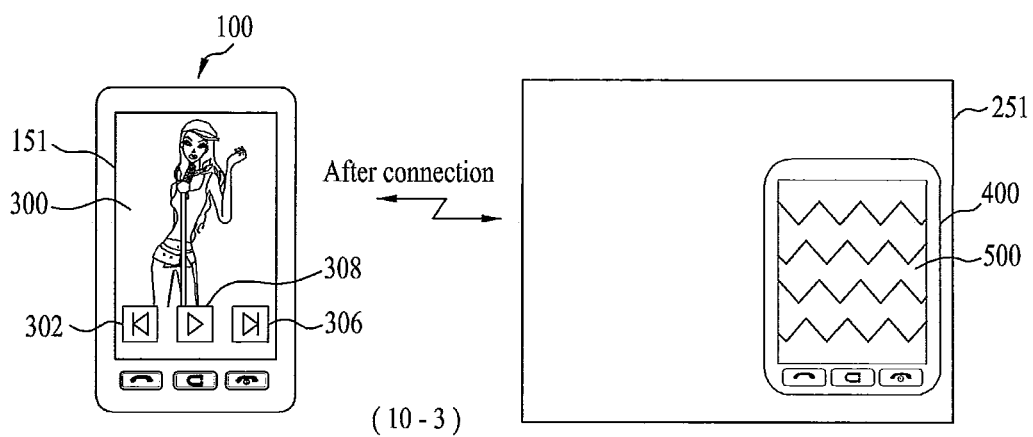

In particular, FIG. 9 is a flowchart according to an embodiment of the present invention, and FIG. 10 is a diagram of a front side of the mobile terminal 100 and a screen of a display unit of the display device 200 according to an embodiment of the present invention.

Referring to FIGS. 9 and 10, before the mobile terminal 100 and the display device 200 are connected to each other, the multimedia content can be played in the mobile terminal 100 (S91).

If so, referring to FIG. 10 (10-1), the multimedia content image can be displayed as the first screen image 300 on the first display unit 151 of the mobile terminal 100 (S92). FIG. 10 (10-1) shows that the first controller 180 of the mobile terminal 100 controls control icons 302, 304 and 306 for the playback of the multimedia content to be displayed in the first screen image 300. Optionally, the control icons 302, 304 and 306 may not be displayed in the first screen image 300.

However, because the mobile terminal 100 and the display device 200 have not yet been connected to each other, the monitor window 400 may not be displayed on the second display unit 251 of the display device 200. Therefore, the multimedia content image is not displayed on the second display unit 251 of the display device 200.

Subsequently, the mobile terminal 100 and the display device 200 are connected to each other (S93). If so, the first controller 180 of the mobile terminal 100 determines whether the mobile terminal 100 retains a transmission authority of the multimedia content (S94).

As a result, if the mobile terminal 100 retains the transmission authority of the multimedia content (Yes in S94), referring to FIG. 10 (10-2), the first controller 180 of the mobile terminal 100 transmits the video information of the multimedia content as information on the first screen image to the display device 200 while continuing to play the multimedia content (S95). Therefore, the multimedia content image can be displayed on the monitor window 400 of the second display unit 251 of the display device 200. This is already discussed in the foregoing description and its details are omitted from the following description for clarity. As the first control icon (e.g., an icon 'pause') 304 in the first screen image 300 shown in FIG. 10 (10-1) is still displayed in the first screen image 300 shown in FIG. 10 (10-2), FIG. 10 (10-2) shows that the multimedia content keeps being played.

However, if the mobile terminal 100 does not retain the transmission authority of the multimedia content (No in S94), referring to FIG. 10 (10-3), the first controller 180 of the mobile terminal 100 interrupts the playback of the multimedia content and controls the video information of the multimedia content not to be transmitted to the display device 200 (S96). As mentioned in the foregoing description, an alternative image can be displayed on the second display unit 251 of the display device 200 (FIG. 10 (10-3)).

In this instance, the playback of the multimedia content is interrupted due to the reason as follows. First of all, a terminal user may intend to view the multimedia content image on the display device 200 by connecting the mobile terminal 100 and the display device 200 together. However, the terminal user may not be able to view the multimedia content image on the display device 200 due to an absence of the transmission authority. If the multimedia content image keeps being played in the mobile terminal 100 during a time interval for the terminal user to recognize that the multimedia content image is not viewable due to the absence of the transmission authority, this may cause a problem that the terminal user is unable to correctly view the multimedia content image during the time interval. In order to prevent such a problem in advance, pausing the play of the multimedia content may be advantageous for the terminal user to view the multimedia content.

As the first control icon (e.g., the 'pause' icon) 304 in the first screen image 300 shown in FIG. 10 (10-1) is changed into the second control icon (e.g., the 'play' icon) 308 in the first screen image 300 shown in FIG. 10 (10-3), FIG. 10 (10-3) shows that the play of the multimedia content is paused.

Afterwards, if the play icon 308 is touched and selected from the first display unit 151 of the mobile terminal 100, the mobile terminal 100 is able to play back the multimedia content without transmitting the video information of the multimedia content to the display device 200.

Whether to maintain the play of the multimedia content in the first display unit 151 when the mobile terminal and the display device are connected to each other will now be explained in detail with reference to FIGS. 11 and 12.

Figure 11:
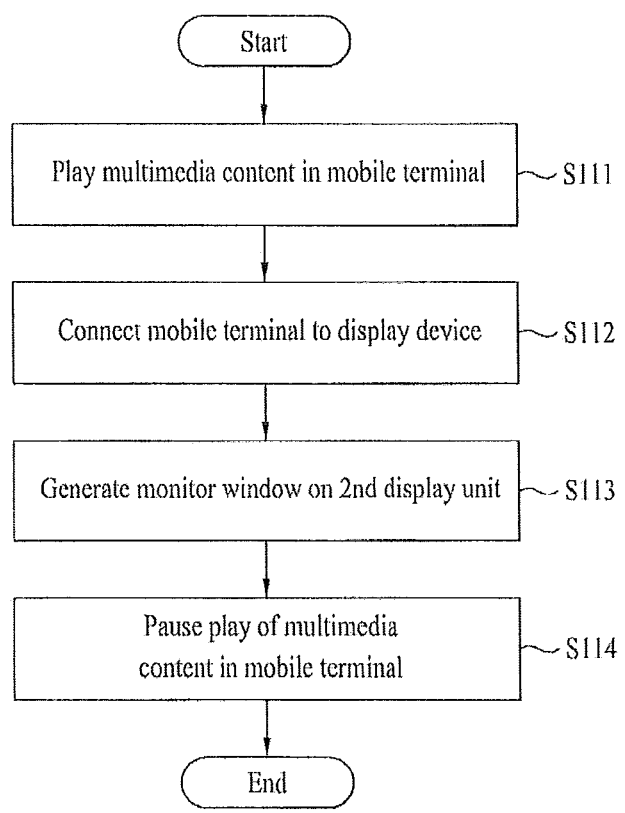
FIG. 11 is a flowchart according to an embodiment of the present invention.
Figure 12:
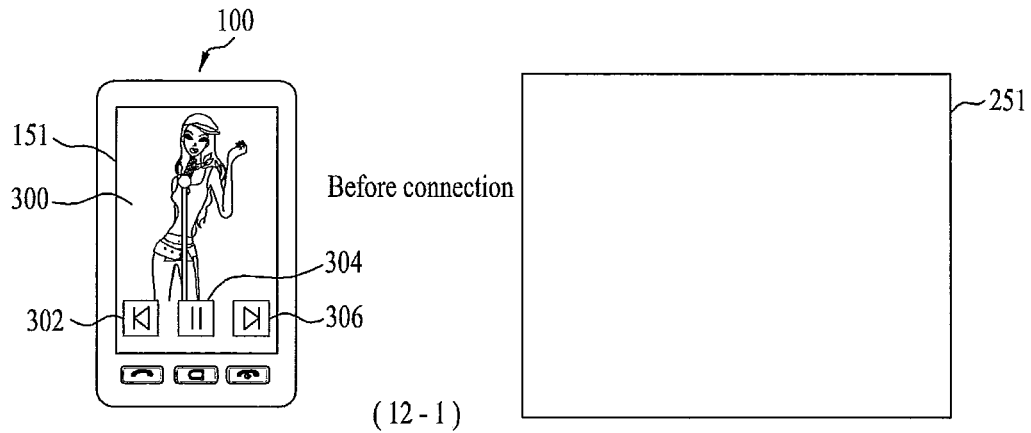
FIG. 12 is a diagram of a front side of a mobile terminal and a screen of a display unit of a display device according to an embodiment of the present invention.
Figure 12:
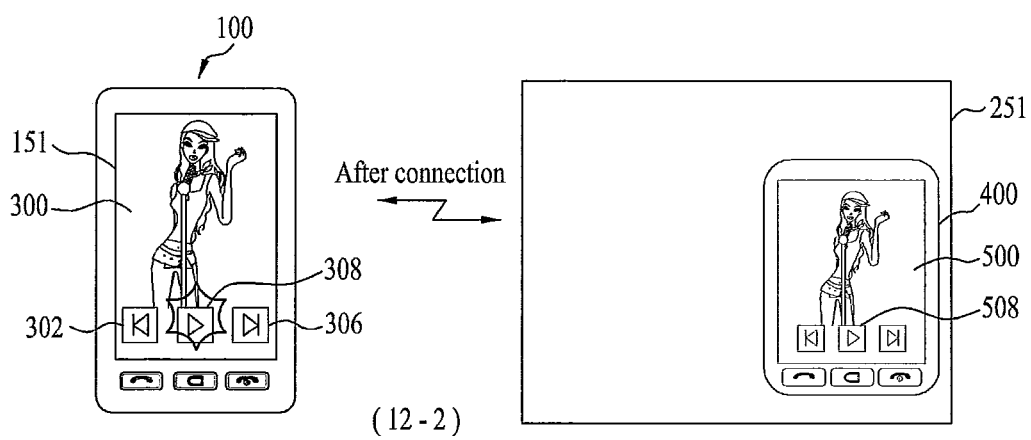
Figure 12:
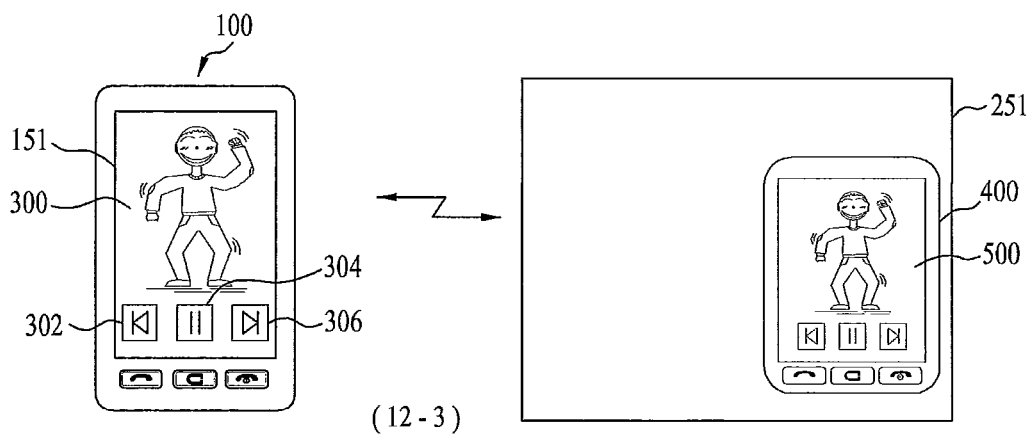

In particular, FIG. 11 is a flowchart according to an embodiment of the present invention, and FIG. 12 is a diagram of a front side of the mobile terminal 100 and a screen of a display unit of the display device 200 according to an embodiment of the present invention.

Referring to FIGS. 11 and 12, before the mobile terminal 100 is connected to the display device 200, the multimedia content can be played in the mobile terminal 100 (S111). If so, referring to FIG. 12 (12-1), the multimedia content image can be played back as the first screen image 300 in the mobile terminal 100. As mentioned in the foregoing description, control icons 302, 304 and 306 for the playback of the multimedia content can be displayed in the first screen image 300. Since the mobile terminal 100 and the display device 200 are not yet connected to each other, the monitor window 400 is not generated from the second display unit 251 of the display device 200.

While the mobile terminal 100 is playing back the multimedia content, the mobile terminal 100 and the display device 200 can be connected to each other (S112). If so, as mentioned in the foregoing description, the mobile terminal 100 can provide a video information of the multimedia content as an information on the first screen image 300 to the display device 100. Subsequently, the display device 200 generates the monitor window 400 from the second display unit 251 and displays the multimedia content image as the second screen image 500 on the monitor window 400 using the provided video information of the multimedia content (S113).

When the mobile terminal 100 and the display device 200 are connected to each other, referring to FIG. 12 (12-2), the first controller 180 of the mobile terminal 100 can control the play of the multimedia content to be paused (S114). Therefore, the paused multimedia content image can be displayed as the first screen image 300 and the second screen image 500 on the first display unit 151 of the mobile terminal 100 and the second display unit 251 of the display device 200, respectively.

The reason why the play of the multimedia content is paused will now be schematically explained. First of all, a terminal user may intend to view the multimedia content image on the display device 200 by connecting the mobile terminal 100 and the display device 200 together. If the multimedia content image keeps being played in the mobile terminal 100 during a time interval for the terminal user to move his vision from the first display unit 151 of the mobile terminal 100 to the second display unit 251 of the display device 200, this may cause a problem that the terminal user is unable to correctly view the multimedia content image during the time interval. In order to prevent such a problem in advance, pausing the play of the multimedia content may be advantageous for the terminal user to view the multimedia content.

As the first control icon (e.g., the 'pause' icon) 304 in the first screen image 300 shown in FIG. 12 (12-1) is changed into the second control icon (e.g., the 'play' icon) 308 in the first screen image 300 shown in FIG. 12 (12-2), FIG. 12 (12-2) shows that the play of the multimedia content is paused.

Afterwards, if the play icon 308 is touched and selected from the first display unit 151 of the mobile terminal 100 or a play icon 508 is selected from the second display unit 251 of the display device 200, the mobile terminal 100 can play back the multimedia content. If the multimedia content is played back again in the mobile terminal 100, referring to FIG. 12 (12-3), an image of the played multimedia content can be displayed on both of the first display unit 151 of the mobile terminal 100 and the second display unit 251 of the display device 200.

Figure 13:
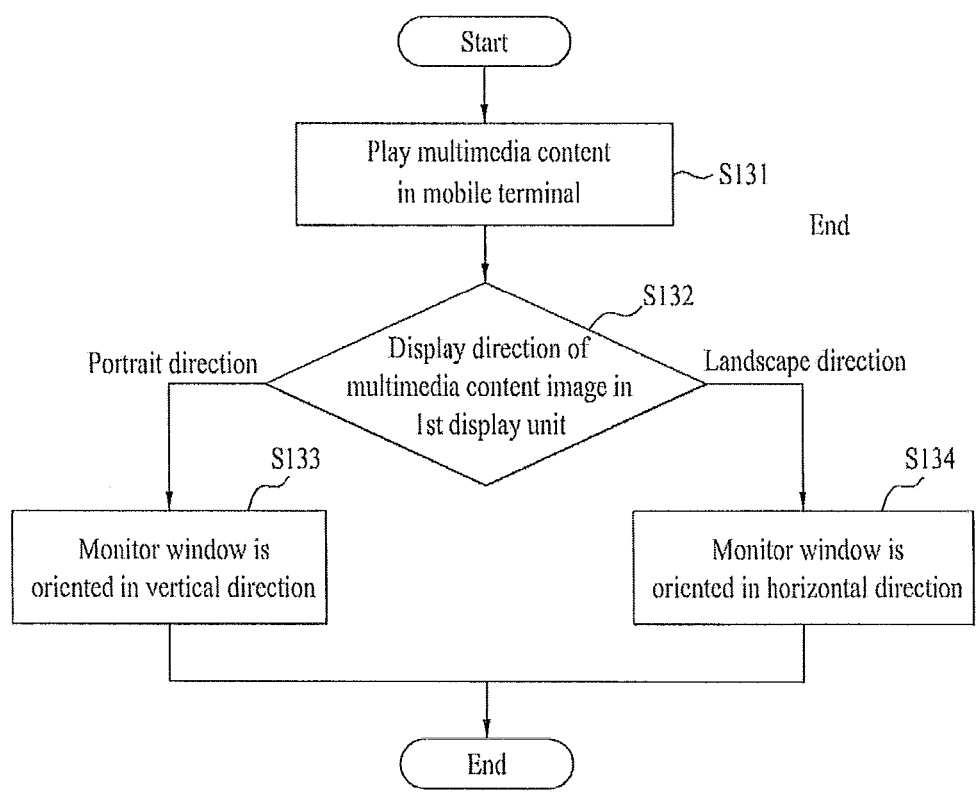
FIG. 13 is a flowchart according to an embodiment of the present invention.

A process for changing an orientation direction of the monitor window 400 in the display device 200 to cope with a display direction of the first screen image in the mobile terminal will now be explained in detail with reference to FIGS. 13 and 14. In particular, FIG. 13 is a flowchart according to an embodiment of the present invention, and FIG. 14 is a diagram of a front side of the mobile terminal 100 and a screen of a display unit of the display device 200 according to an embodiment of the present invention.

Figure 14:
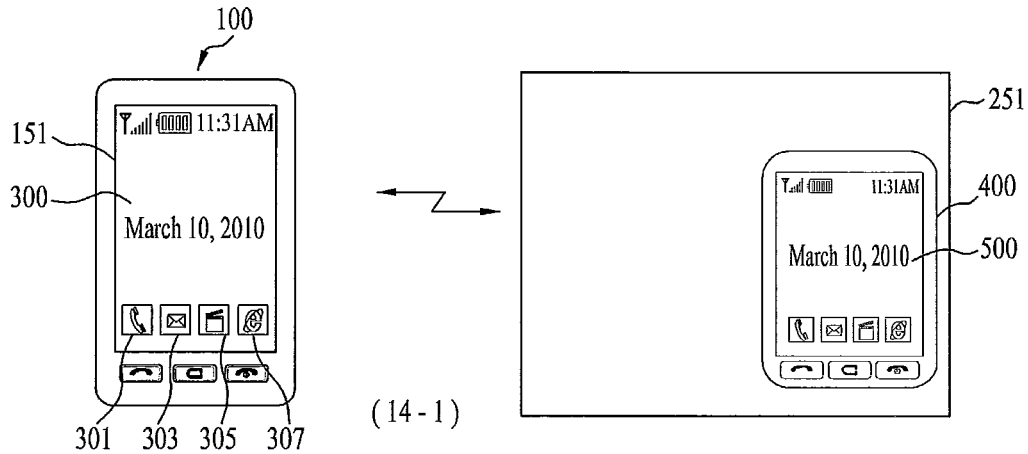
FIG. 14 is a diagram of a front side of a mobile terminal and a screen of a display unit of a display device according to an embodiment of the present invention.
Figure 14:
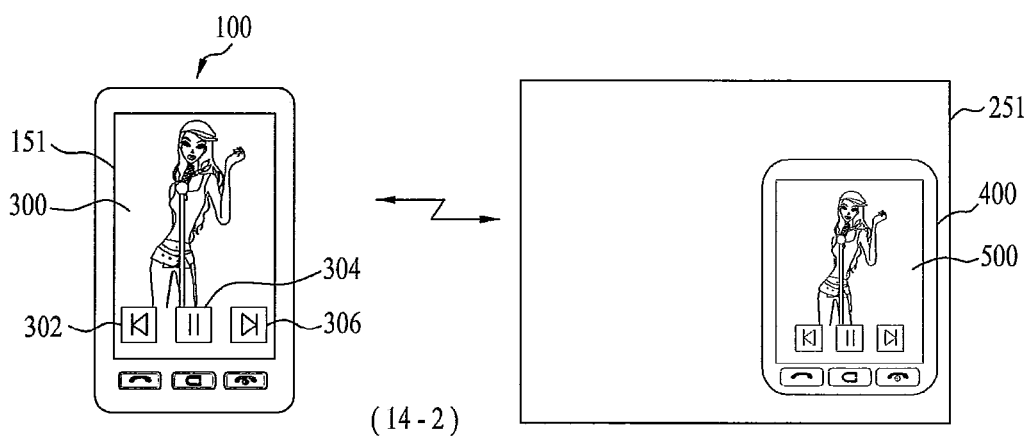
Figure 14:
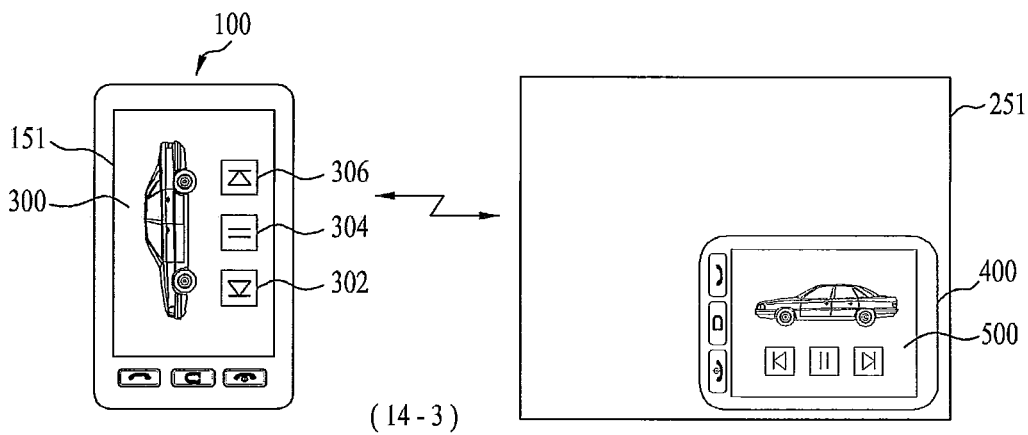

Referring to FIG. 14 (14-1), the first screen image 300 is displayed on the first display unit 151 of the mobile terminal 100, the monitor window 400 is displayed on the second display unit 251 of the display device 200, and the second screen image 500 is displayed on the monitor window 400. If the multimedia play menu icon 305 is touched and selected from the first screen image 300 of the display unit 151, the multimedia content is played in the mobile terminal 100 (S131).

In doing so, the first controller 180 of the mobile terminal 100 determines a display direction of the multimedia content image played on the first display unit 151 (S132). In this instance, the display direction of the multimedia content image is determined by at least one of a display direction information previously included in the multimedia content, an application for playing back the multimedia content, and an orientation direction of a housing of the mobile terminal 100.

As a result of the determination, referring to FIG. 14 (14-2), if the display direction of the multimedia content image is a portrait direction, the first controller 180 of the mobile terminal 100 provides the display device 200 with a first control signal indicating that the display direction of the multimedia content image is the portrait direction. If so, referring to FIG. 14 (14-2), the second controller 280 of the display device 200 can control the monitor window 400 to be automatically oriented in a first direction (e.g., a vertical direction) in response to the first control signal (S133).

As a result of the determination, referring to FIG. 14 (14-3), if the display direction of the multimedia content image is a landscape direction, the first controller 180 of the mobile terminal 100 can provide the display device 200 with a second control signal indicating that the display direction of the multimedia content image is the landscape direction. If so, referring to FIG. 14 (14-3), the second controller 280 of the display device 200 controls the monitor window 400 to be automatically oriented in a second direction (e.g., a horizontal direction) in response to the second control signal (S134).

A process for determining whether to maintain a play of the multimedia content in the first display unit 151 when the mobile terminal 100 and the display device 200 are disconnected from each other will now be explained in detail with reference to FIGS. 15 and 16. In particular, FIG. 15 is a flowchart according to an embodiment of the present invention, and FIG. 16 is a diagram of a front side of the mobile terminal 100 and a screen of a display unit of the display device 200 according to an embodiment of the present invention.

Figure 15:
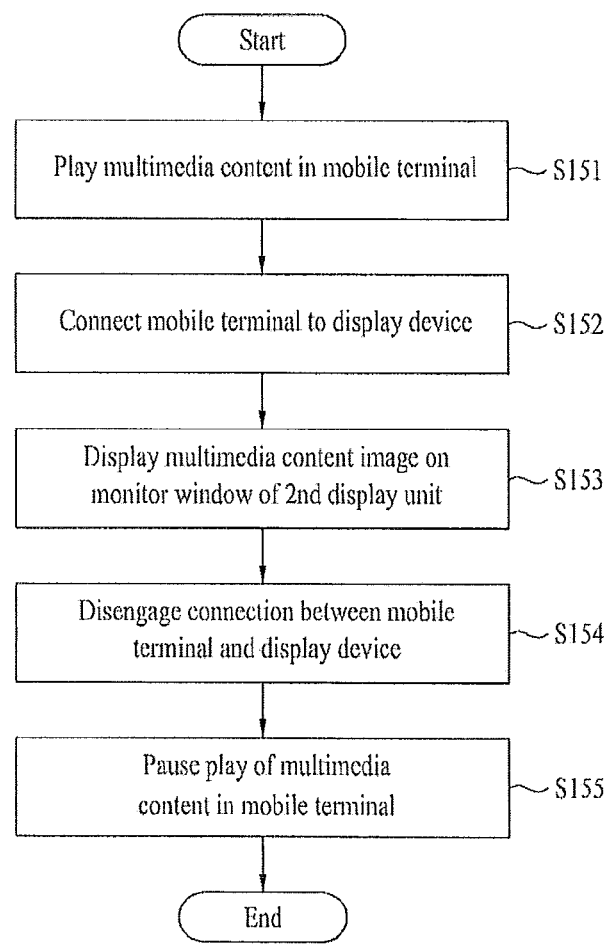
FIG. 15 is a flowchart according to an embodiment of the present invention.
Figure 16:
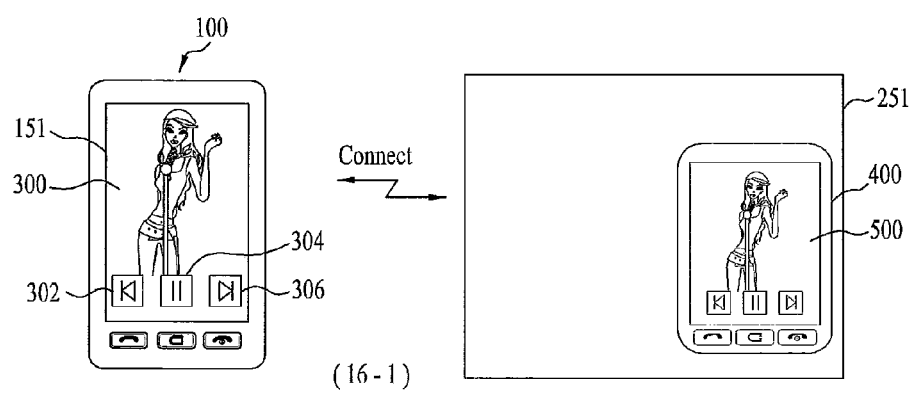
FIG. 16 is a diagram of a front side of a mobile terminal and a screen of a display unit of a display device according to an embodiment of the present invention.
Figure 16:
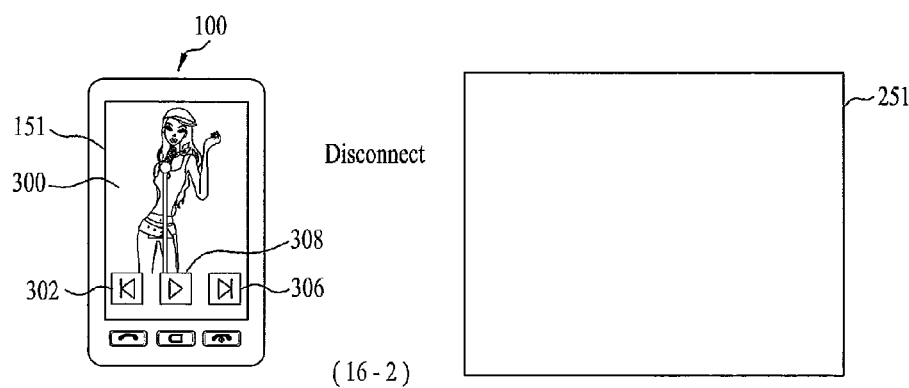

Referring to FIGS. 15 and 16, the mobile terminal 100 and the display device 400 are connected to each other (S151). The multimedia content can be then played back in the mobile terminal 100 (S152). If so, referring to FIG. 16 (16-1), the multimedia content image can be displayed on both of the first display unit 151 of the mobile terminal 100 and the second display unit 251 of the display device 200 (S153). As the first control icon (e.g., a 'pause' icon) 304 is displayed in the multimedia content image displayed on the first display unit 151 of the mobile terminal 100, it can be observed that the multimedia content is being played back. This is explained in the foregoing description and its details are omitted from the following description for clarity.

In doing so, the connection between the mobile terminal 100 and the display device 200 can be disengaged (S154). If so, it is unable to further play back the multimedia content image in the second display unit 251 of the display device 200. In particular, the second controller 280 of the display device 200 has the monitor window 400 disappear from the second display unit 251, thereby controlling the multimedia content image not to be further displayed on the second display unit 251 of the display device 200.

In doing so, the first controller 180 of the mobile terminal 100 detects the disengagement of the connection and can then control the play of the multimedia content to be automatically paused.

The reason why the play of the multimedia content is paused is schematically explained as follows. First of all, since the monitor window disappears, if the multimedia content image keeps being played in the mobile terminal 100 during a time interval for a terminal user to move his vision from the second display unit 251 of the display device 200 to the first display unit 151 of the mobile terminal 100, this may cause a problem that the terminal user is unable to correctly view the multimedia content image during the time interval. In order to prevent such a problem in advance, pausing the play of the multimedia content may be advantageous for the terminal user to view the multimedia content.

As the first control icon (e.g., the 'pause' icon) 304 in the first screen image 300 shown in FIG. 16 (16-1) is changed into the second control icon (e.g., the 'play' icon) 308 in the first screen image 300 shown in FIG. 16 (16-2), FIG. 16 (16-2) shows that the play of the multimedia content is paused.

When the mobile terminal 100 and the display device 200 are re-connected to each other, the multimedia content is automatically played back again in the mobile terminal 100 as soon as the monitor window 400 is generated from the second display unit 251 of the display device 200. Therefore, an image of the played multimedia content can be displayed on both the first display unit 151 of the mobile terminal 100 and the monitor window 400 of the second display unit 251 of the display device 200.

When the mobile terminal 100 and the display device 200 are connected to each other, whether the monitor window is generated from the second display unit 251 of the display device 200 may depend on whether the display device 200 is connected to an auxiliary display device (e.g., a projector, etc.). This is explained in detail with reference to FIGS. 17 to 19 as follows.

Figure 17:
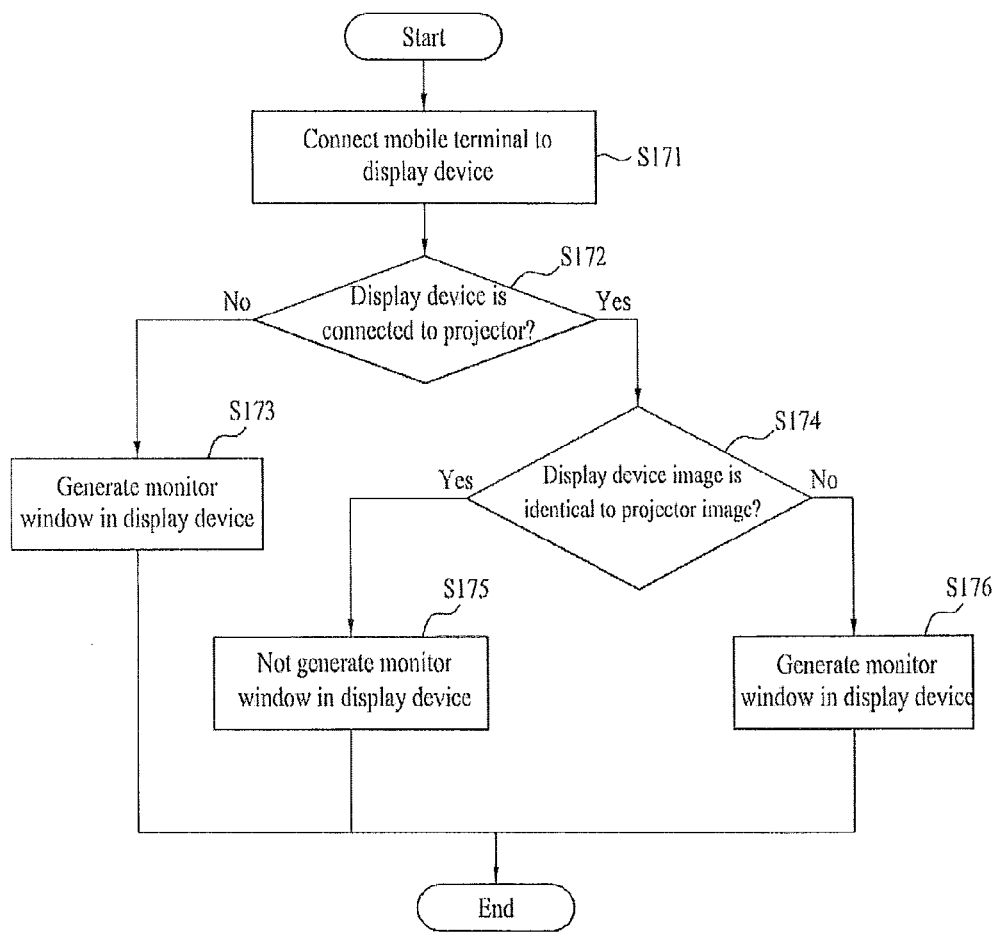
FIG. 17 is a flowchart according to an embodiment of the present invention.
Figure 18:
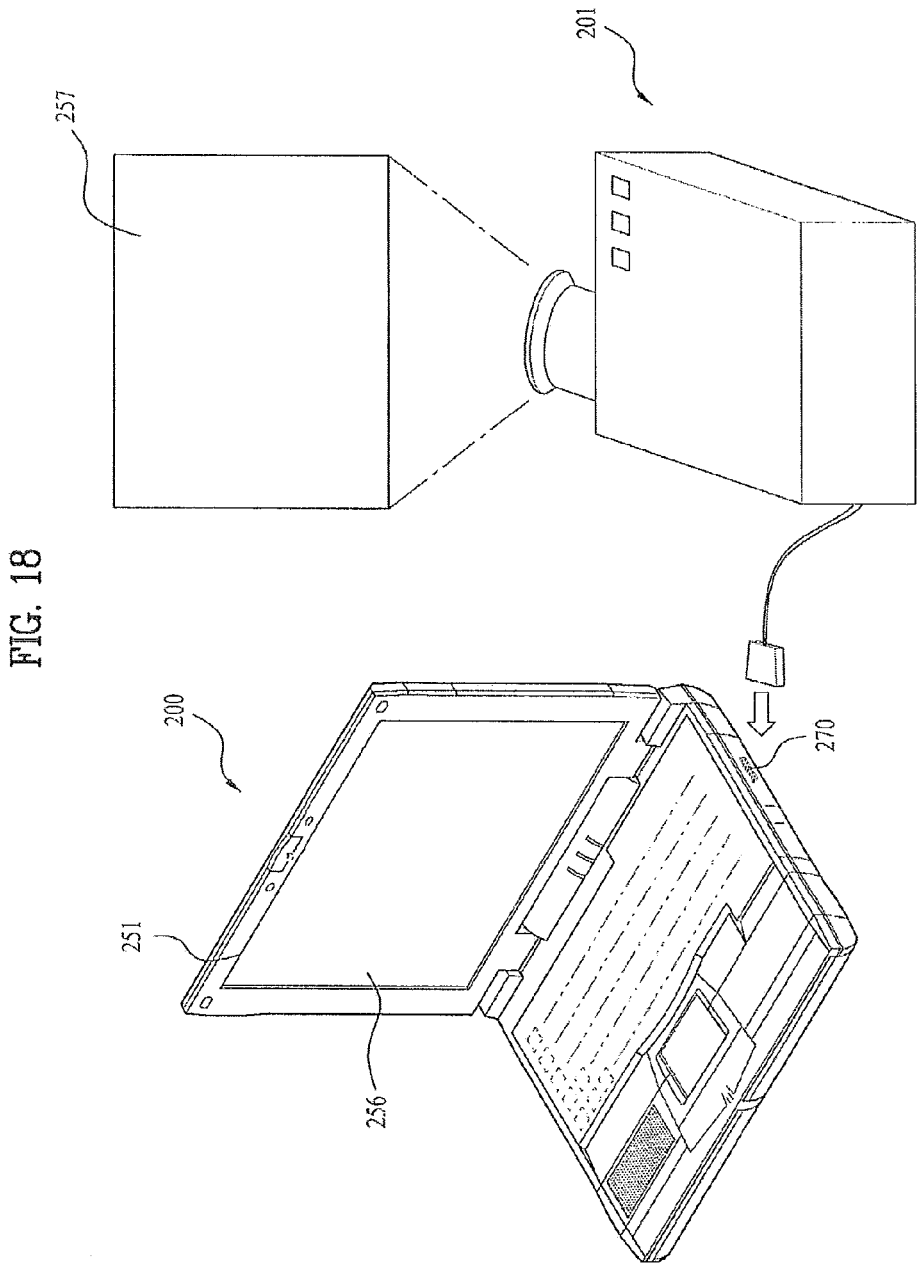
FIG. 18 is a diagram of an auxiliary display device connected to a display device according to an embodiment of the present invention.
Figure 19:
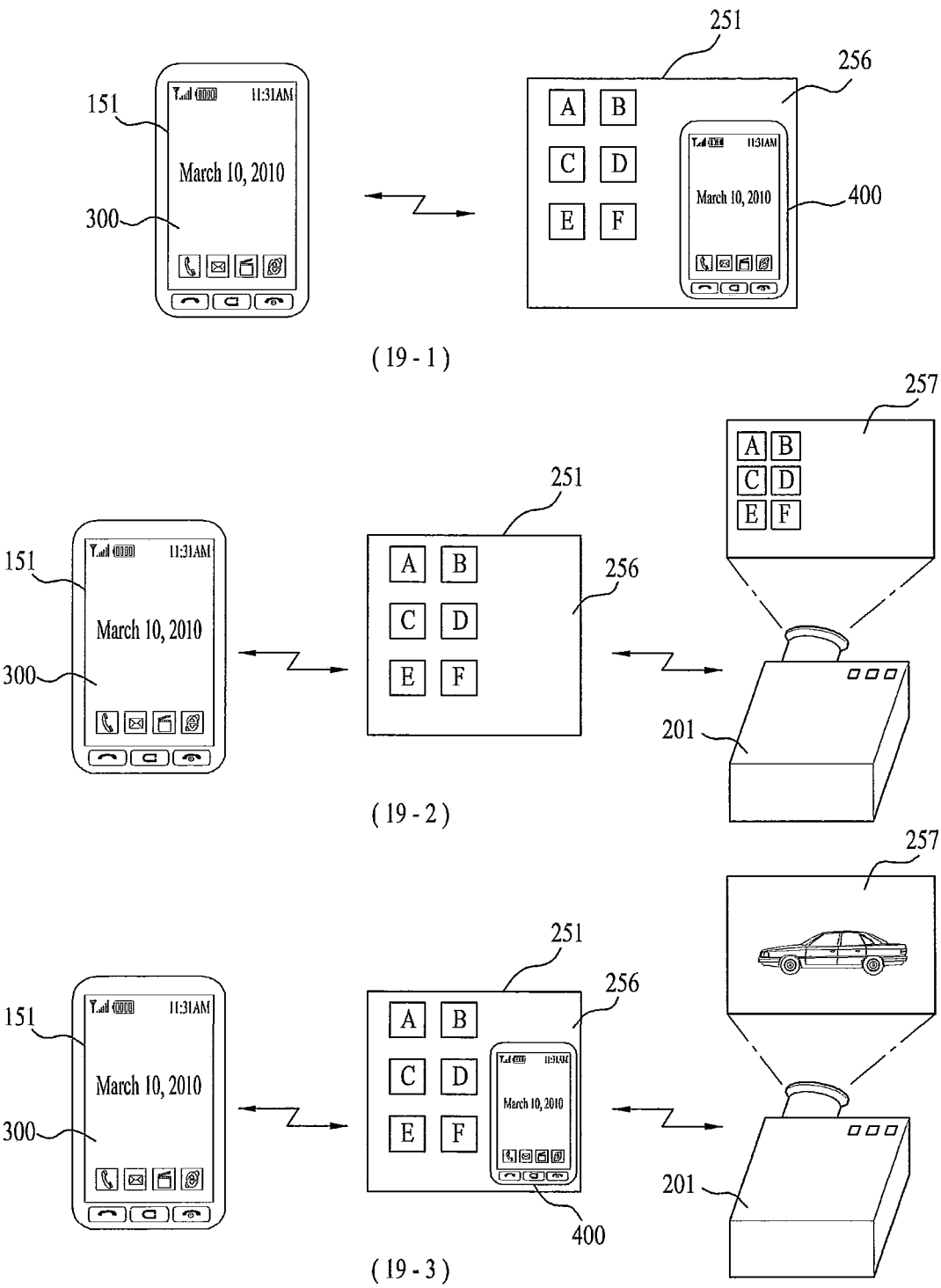
FIG. 19 is a diagram of a mobile terminal, a display device and an auxiliary display device according to an embodiment of the present invention.

In particular, FIG. 17 is a flowchart according to an embodiment of the present invention, FIG. 18 is a diagram of an auxiliary display device connected to a display device according to an embodiment of the present invention, and FIG. 19 is a diagram of the mobile terminal 100, the display device 200 and an auxiliary display device 201 according to an embodiment of the present invention.

A process for connecting the display device 200 to the auxiliary display device 201 is described with reference to FIG. 18 as follows. Referring to FIG. 18, the display device 200 such as a notebook computer can be connected to the auxiliary display device 201 via a second interface unit 270. In this instance, the auxiliary display device 201 can include one of a projector, an auxiliary monitor for dual monitor, a digital TV and the like. In the following description, the auxiliary display device 201 includes the projector. Further, the second interface unit 270 is connectible via one of D-SUB connector, DVI connector, USB connector, HDMI connector, Bluetooth and the like.

The projector can project the same image of the second display unit 251 of the display device 200 or another image separate from the image of the second display unit 251 of the display device 200. For clarity of the following description, an image of the second display unit 251 of the display device 200 is named a display device image 256 and an image projected by the projector 201 is named a projector image 257.

The display device 200 can also be connected to the mobile terminal 100. If so, the second controller 280 of the display device 200 determines whether the display device 200 is connected to the projector 201.

As a result of the determination, if the display device 200 is not connected to the projector 201 (No in S172), referring to FIG. 19 (19-1), the second controller 280 of the display device 200 controls the monitor window 400 to be generated from the second display unit 251 when the display device 200 and the mobile terminal 100 are connected to each other (S173). The process for generating the monitor window 400 from the second display unit 251 is already described in the foregoing description and its details are omitted for clarity of the following description.

On the contrary, as a result of the determination, if the display device 200 is already connected to the projector 201 (Yes in S172), the second controller 280 of the display device 200 further determines whether the display device image 256 is identical to the projector image 257 (S174).

As a result of the determination, if the display device image 256 is identical to the projector image 257 (Yes in S174), referring to FIG. 19 (19-2), the second controller 280 of the display device 200 controls the monitor window 400 not to be generated from the second display unit 251 despite that the display device 200 and the mobile terminal 100 are connected to each other (S175). Since the monitor window is not displayed on the second display unit 251 of the display device 200, the monitor window is not displayed in the projector image 257 identical to the display device image 256.

On the contrary, as a result of the determination, if the display device image 256 is not identical to the projector image 257 (No in S174), referring to FIG. 19 (19-3), the second controller 280 of the display device 200 controls the monitor window 400 to be generated from the second display unit 251 when the display device 200 and the mobile terminal 100 are connected to each other (S176). Even if the monitor window 400 is displayed on the second display unit 251 of the display device 200, the monitor window 400 is not displayed in the projector image 257 different from the display device image 256.

When the display device 20 is connected to the projector 201, the projector image 257 can be shared with other users as well as the terminal user in the course of presentation, for example. Therefore, as the monitor window 400 is set not to be displayed in the projector image 257, the terminal user's privacy can be protected.

Even though the mobile terminal 100 and the display device 200 are connected to each other, if the monitor window 400 is not displayed on the second display unit 251 of the display device 200, an announcement, which indicates that the monitor window 400 is not displayed due to the connection between the display device 200 and the projector 201, can be displayed on the second display unit 251 of the display device 200.

A process for displaying additional information on the multimedia content together with the multimedia content image when the multimedia content image is displayed on the second display unit 251 of the display device 200 will now be explained in detail with reference to FIGS. 20 and 21.

Figure 20:
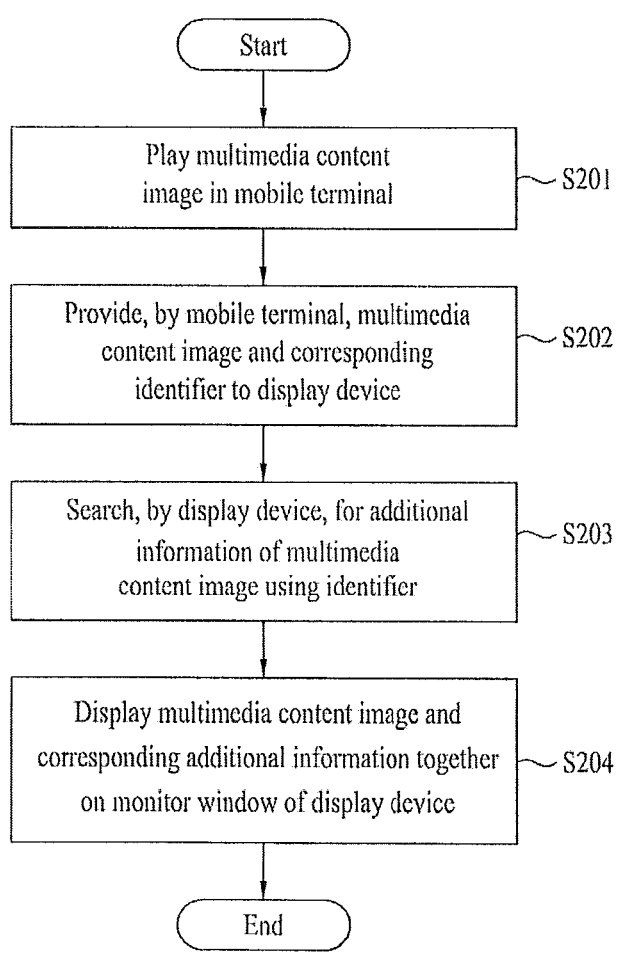
FIG. 20 is a flowchart according to an embodiment of the present invention.
Figure 21:
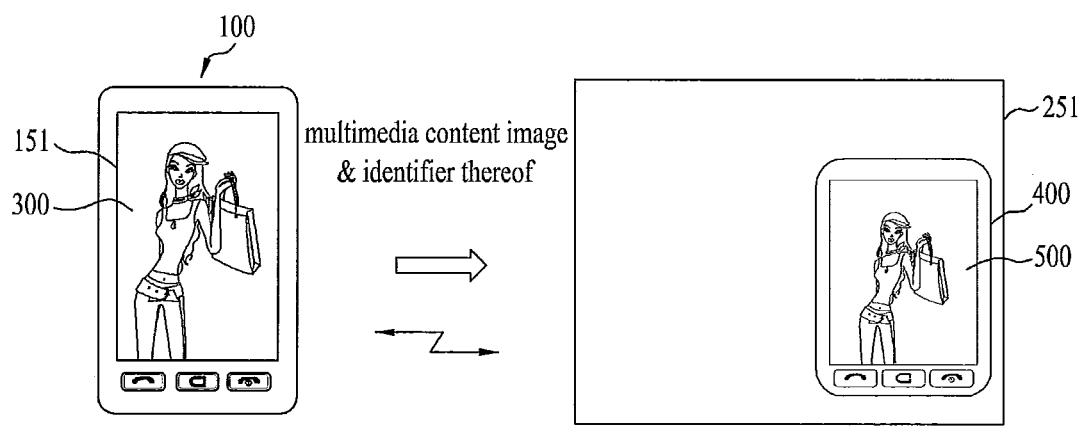
FIG. 21 is a diagram of a front side of a mobile terminal and a screen of a display unit of a display device according to an embodiment of the present invention.
Figure 21:
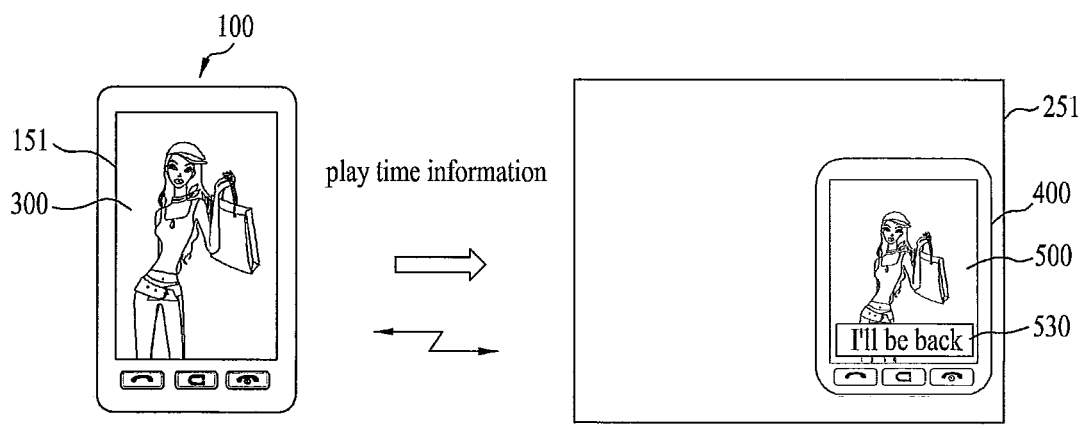

In particular, FIG. 20 is a flowchart according to an embodiment of the present invention, and FIG. 21 is a diagram of a front side of the mobile terminal 100 and a screen of a display unit of the display device 200 according to an embodiment of the present invention.

Referring to FIGS. 20 and 21, no limitation is put on the additional information of the multimedia content. For instance, if the multimedia content is a movie content, the additional information can include director information, character information, caption information and the like. When the multimedia content is a music content, the additional information can include composer information, writer information, singer information, lyrics information and the like.

After the mobile terminal 100 and the display device 200 have been connected to each other, the multimedia content can be played in the mobile terminal 100 (S201). Alternatively, after the multimedia content has been played, the mobile terminal 100 and the display device 200 can be connected to each other.

If so, referring to FIG. 21 (21-1), the multimedia content image can be displayed on both of the first display unit 151 of the mobile terminal 100 and the monitor window 400 of the second display unit 251 of the display device 200.

When the first controller 180 of the mobile terminal 100 provides the display device 200 with the multimedia content image as an information on the first screen image, the first controller 180 of the mobile terminal 100 can provide an identifier (e.g., a file name, etc.) of the multimedia content together with the multimedia content image.

Subsequently, the second controller 280 of the display device 200 can search for the additional information of the multimedia content using the identifier of the multimedia content. In this instance, the additional information can be searched from the second memory unit 260 of the display device 200. Alternatively, after the display device 200 has accessed a specific server via the Internet, the additional information can be searched from the accessed specific server.

Referring to FIG. 21 (21-2), the second controller 280 of the display device 200 can control the searched additional information 530 to be displayed on the monitor window 400 together with the multimedia content image.

For instance, when the additional information includes the caption information or the lyrics information, a play time information of the multimedia content may be required to display the additional information. In this instance, the second controller 280 of the display device 200 can further receive the play time information from the mobile terminal 100.

The monitor window 400 displayed in the display device 200 when at least two functions are multitasked in the mobile terminal 100 will now be explained in detail with reference to FIGS. 22 and 23.

Figure 22:
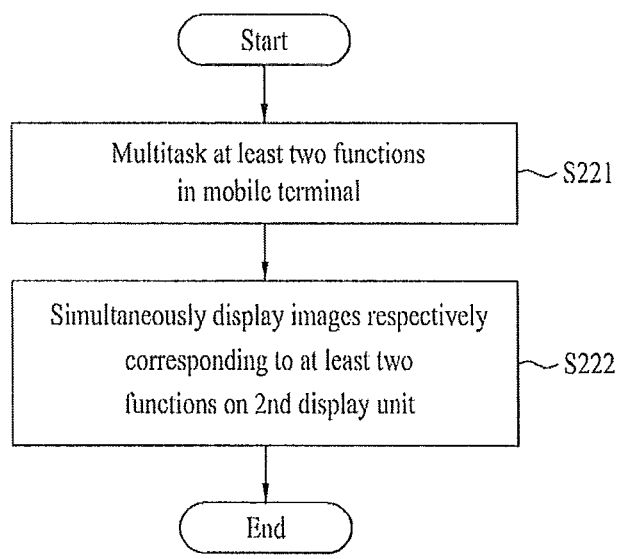
FIG. 22 is a flowchart according to an embodiment of the present invention.
Figure 23:
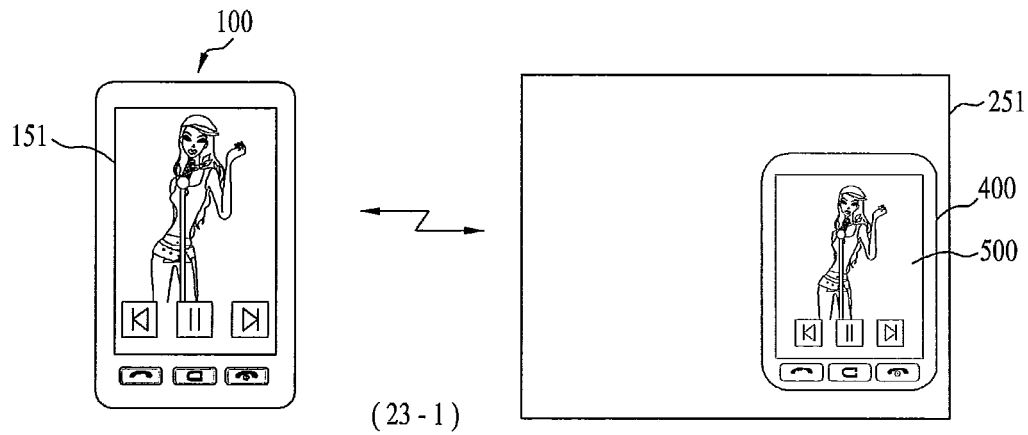
FIG. 23 is a diagram of a front side of a mobile terminal and a screen of a display unit of a display device according to an embodiment of the present invention.
Figure 23:
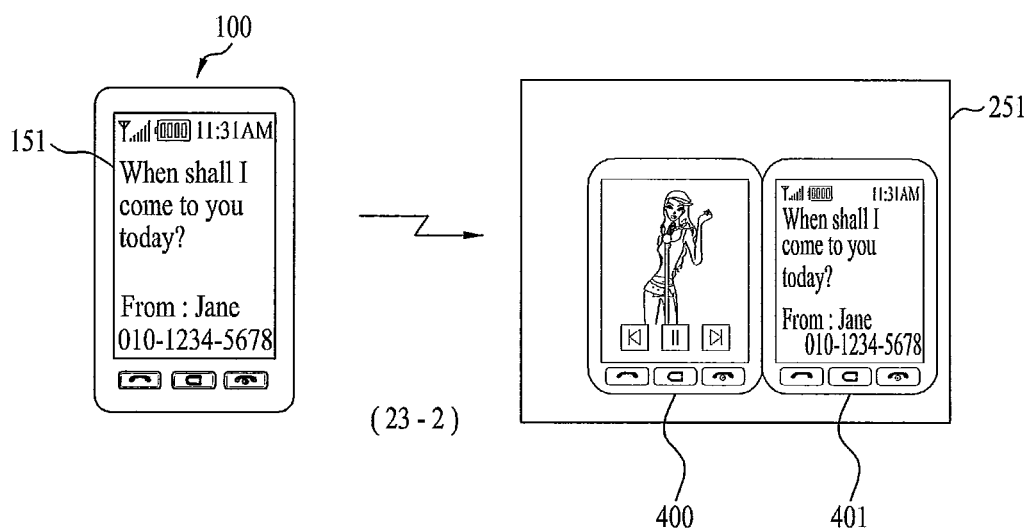
Figure 23:
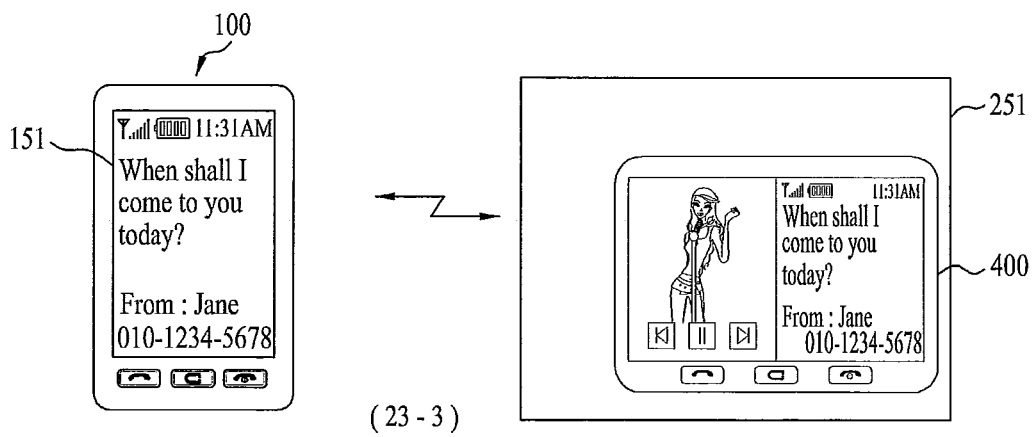

In particular, FIG. 22 is a flowchart according to an embodiment of the present invention, and FIG. 23 is a diagram of a front side of the mobile terminal 100 and a screen of a display unit of the display device 200 according to an embodiment of the present invention.

Referring to FIGS. 22 and 23, after the mobile terminal 100 and the display device 200 have been connected to each other, a first function (e.g., a play of the multimedia content) can be executed in the mobile terminal 100. If so, referring to FIG. 23 (23-1), a first function image (i.e., the multimedia content image) can be displayed on both of the first display unit 151 of the mobile terminal 100 and the monitor window 400 of the second display unit 251 of the display device 200.

While the first function is being executed in the mobile terminal 100, if a second function (e.g., a message view execution) is newly executed, both of the first and second functions can be multitasked by the mobile terminal 100. If so, referring to FIG. 23 (23-2), the first controller 180 of the mobile terminal 100 controls a second function image (e.g., a message image) to be displayed as a first screen image on the first display unit 151 of the mobile terminal 100. In doing so, a whole part or portion of the first function image may not be displayable on the first display unit 151 due to the second function image.

However, the first controller 180 of the mobile terminal 100 can provide the display device 200 with both of the first function image and the second function image as the information on the first screen image. If so, referring to FIG. 23 (23-2), the second controller 280 of the display device 200 can control a first monitor window 400 and a second monitor window 401 (that is, two monitor windows) to be simultaneously displayed on the second display unit 251 to display the first function image and the second function image thereon, respectively.

Alternatively, referring to FIG. 23 (23-3), the second controller 280 of the display device 200 can control the monitor window 400 (that is, a single monitor window) to be enlarged in size to simultaneously display both of the first function image and the second function image.

Therefore, when the first function image and the second function image are multitasked in the mobile terminal 100, a whole part or portion of either the first function image or the second function image can be displayed on the first display unit 151 of the mobile terminal 100. Further, both of the first function image and the second function image can be displayed on the second display unit 251 of the display device 200.

In addition, the user can set a predetermined amount of time the mobile terminal/display device should pause the playing of the multimedia contact.

As mentioned in the foregoing description, the present invention is applicable to a mobile terminal including a mobile phone, a smart phone, a notebook computer (e.g., a laptop), a digital broadcast terminal, a PDA (personal digital assistants), a PMP (portable multimedia player), a navigation system and the like and/or such a display device as a notebook computer (e.g., laptop), a tablet computer, a desktop computer, a television set (e.g., a digital TV set, a smart TV set, etc.) and the like.

Accordingly, the present invention provides several advantages. First of all, according to at least one of the embodiments of the present invention, as the mobile terminal and the display device are connected to each other, when a multimedia content is played in the mobile terminal, an image of the multimedia content is played in the display device in consideration of whether the mobile terminal or the display device has a use authority of the multimedia content. Therefore, a violation of the use authority can be prevented.

Secondly, according to at least one of the embodiments of the present invention, when the mobile terminal and the display device are connected/disconnected to/from each other, the multimedia content playback in the mobile terminal can be temporarily interrupted.

Thirdly, according to at least one of the embodiments of the present invention, when the mobile terminal and the display device are connected/disconnected to/from each other, a terminal user's privacy can be protected.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include transmission via the Internet, etc. Further, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a first display unit;
   an interface unit configured to be connected to an external display device having a second display unit; and
   a controller configured to:
   display and play a multimedia content on the first display unit,
   provide video information of the multimedia content to the external display device,
   display the multimedia content on the second display unit, when the mobile terminal is connected to the external display device, and
   change a display region of the multimedia content on the second display unit according to a display direction of the multimedia content displayed on the first display unit,
   such that when the multimedia content is displayed in a portrait direction on the first display unit, the controller is further configured to display the multimedia content on a first region within the second display unit, and
   such that when the multimedia content is displayed in a landscape direction on the first display unit, the controller is further configured to change the display region from the first region of the second display unit to a second region of the second display unit so as to display the multimedia content on the second region within the second display unit,
   wherein the first region is different from but overlapped with the second region, and
   wherein the controller is further configured to check if the mobile terminal includes a forwarding authority authorizing the mobile terminal to forward the multimedia content to the external display device, and to pause the playing of the multimedia content on the first display unit when the mobile terminal does not include the forwarding authority of the multimedia content.

2. The mobile terminal of claim 1,
   wherein the controller is further configured to, when the mobile terminal and the external display device are disconnected from each other, pause the playing of the multimedia content on the first display unit.

3. The mobile terminal of claim 1,
   wherein the controller is further configured to transmit an identifier of the multimedia content to the external display device and to control the external display device to retrieve additional information about the multimedia content using the identifier and display the additional information on the second display unit.

4. The mobile terminal of claim 1,
   wherein when the mobile terminal is playing the multimedia content on the first display unit and another function is executed on the mobile terminal, the controller is further configured to continue playing the multimedia content and to display information corresponding to said another function on the first display unit, and to control the external display device to simultaneously display the multimedia content in a first window and the information corresponding to said another function in a second window on the second display unit.

5. A display device, comprising:
   an interface unit configured to be connected to an external mobile terminal having a first display unit;
   a second display unit; and
   a controller configured to receive a connection signal indicating a connection of the display device to the external mobile terminal, to receive video information of multimedia content being displayed and played on the first display unit of the external mobile terminal, and to control the external mobile terminal then to pause playing of the multimedia content on the first display unit for a predetermined amount of time,
   wherein the controller is further configured to display a monitor window for displaying the multimedia content on the second display unit, when the display device is connected to the external mobile terminal,
   wherein the controller is further configured to control an orientation direction of the monitor window displayed on the second display unit to automatically match with a display direction of the multimedia content displayed on the first display unit,
   wherein when the multimedia content is displayed in a portrait direction on the first display unit of the external mobile terminal, the controller is further configured to control the monitor window to be oriented in a vertical direction,
   wherein when the multimedia content is displayed in a landscape direction on the first display unit of the external mobile terminal, the controller is further configured to control the monitor window to be oriented in a horizontal direction on the second display unit,
   wherein the controller is further configured to check if the display device includes a play authority authorizing the display device to play the multimedia content, and to control the external mobile terminal to pause the playing of the multimedia content on the first display unit when the display device does not include the play authority of the multimedia content, and
   wherein the external mobile terminal is further configured to check if the external mobile terminal includes a forwarding authority authorizing the external mobile terminal to forward the multimedia content to the display device, and to pause the playing of the multimedia content on the first display unit when the external mobile terminal does not include the forwarding authority of the multimedia content.

6. The display device of claim 5, wherein the controller is further configured to receive a disconnection signal indicating the connection between the display device and the external mobile terminal is disconnected, and to control the external mobile terminal to pause the playing of the multimedia content on the first display unit.

7. The display device of claim 5, wherein the controller is further configured to receive an identifier of the multimedia content from the external mobile terminal, and to retrieve additional information about the multimedia content using the identifier, and to display the additional information on the second display unit.

8. The display device of claim 5, wherein when the external mobile terminal is playing the multimedia content on the first display unit and another function is executed on the external mobile terminal, the controller is further configured to control the external mobile terminal to continue playing the multimedia content and to display information corresponding to said another function on the first display unit, and to simultaneously display the multimedia content in a first window and the information corresponding to said another function in a second window on the second display unit.

9. A method of controlling a mobile terminal, the method comprising:
   connecting, via an interface unit on the mobile terminal, the mobile terminal to an external display device having a second display unit;
   displaying and playing, via a controller, a multimedia content on a first display unit of the mobile terminal;
   transmitting, via the controller, video information of the multimedia content to the external display device;
   displaying the multimedia content on the second display unit, when the mobile terminal is connected to the external display device; and
   changing a display region of the multimedia content displayed on the second display unit according to a display direction of the multimedia content displayed on the first display unit,
   such that when the multimedia content is displayed in a portrait direction on the first display unit, the multimedia content is displayed on a first region within the second display unit, and
   such that when the multimedia content is displayed in a landscape direction on the first display unit, the display region is changed from the first region of the second display unit to a second region of the second display unit so as to display the multimedia content on the second region within the second display unit,
   wherein the first region is different from but overlapped with the second region, and
   wherein the controller is further configured to check if the mobile terminal includes a forwarding authority authorizing the mobile terminal to forward the multimedia content to the external display device, and to pause the playing of the multimedia content on the first display unit when the mobile terminal does not include the forwarding authority of the multimedia content.

10. A method of controlling a display device, the method comprising:
   connecting, via an interface unit on the display device, the display device to an external mobile terminal having a first display unit;
   receiving, via a controller on the display device, a connection signal indicating a connection of the display device to the external mobile terminal;
   receiving, via the controller, video information of multimedia content being displayed and played on the first display unit of the external mobile terminal;
   controlling, via the controller, the external mobile terminal to then pause playing of the multimedia content on the first display unit for a predetermined amount of time;
   displaying a monitor window for displaying the multimedia content on the second display unit, when the display device is connected to the external mobile terminal; and
   controlling an orientation direction of the monitor window displayed on the second display unit to automatically match with a display direction of the multimedia content displayed on the first display unit,
   wherein when the multimedia content is displayed in a portrait direction on the first display unit of the external mobile terminal, the method further comprises controlling the monitor window to be oriented in a vertical direction,
   wherein when the multimedia content is displayed in a landscape direction on the first display unit of the external mobile terminal, the method further comprises controlling the monitor window to be oriented in a horizontal direction on the second display unit,
   wherein the method further comprises:
   checking if the display device includes a play authority authorizing the display device to play the multimedia content, and
   controlling the external mobile terminal to pause the playing of the multimedia content on the first display unit when the display device does not include the play authority of the multimedia content, and
   wherein the external mobile terminal is further configured to check if the external mobile terminal includes a forwarding authority authorizing the external mobile terminal to forward the multimedia content to the display device, and to pause the playing of the multimedia content on the first display unit when the external mobile terminal does not include the forwarding authority of the multimedia content.

11. The mobile terminal of claim 1, wherein the first region has a first width and a first height and the second region has a second width, and
   wherein a second height, and a first ratio of the first width to the first height is smaller than a second ratio of the second width to the second height.

12. The mobile terminal of claim 1, wherein the display direction of the multimedia content on the first display unit is determined by an orientation of a housing of the mobile terminal.

13. The method of claim 9, wherein the first region has a first width and a first height and the second region has a second width and a second height, and
   wherein a first ratio of the first width to the first height is smaller than a second ratio of the second width to the second height.

14. The method of claim 9, wherein the display direction of the multimedia content on the first display unit is determined by an orientation of a housing of the mobile terminal.

* * * * *

UNITED STATES PATENT AND TRADEMARK OFFICE
CERTIFICATE OF CORRECTION

| | | |
|---|---|---|
| PATENT NO. | : 8,565,819 B2 | Page 1 of 1 |
| APPLICATION NO. | : 13/150953 | |
| DATED | : October 22, 2013 | |
| INVENTOR(S) | : Kangwon Zhang et al. | |

It is certified that error appears in the above-identified patent and that said Letters Patent is hereby corrected as shown below:

ON THE TITLE PAGE:

At item (30), Foreign Application Priority Data, change:

"Aug. 13, 2010   (WO)   ........................... PCT/KR2010/005349" to

--Aug. 13, 2010   (WO)   ........................... PCT/KR2010/005332--.

Signed and Sealed this
Twenty-second Day of April, 2014

Michelle K. Lee
*Deputy Director of the United States Patent and Trademark Office*